United States Patent [19]

San Andres et al.

[11] Patent Number: 5,956,489
[45] Date of Patent: *Sep. 21, 1999

[54] TRANSACTION REPLICATION SYSTEM AND METHOD FOR SUPPORTING REPLICATED TRANSACTION-BASED SERVICES

[75] Inventors: Ramon J. San Andres, Berkeley, Calif.; Philippe Choquier, Paris, France; Richard G. Greenberg, Redmond; Jean-Francois Peyroux, Issaquah, both of Wash.

[73] Assignee: Microsoft Corporation, Redmond, Wash.

[*] Notice: This patent issued on a continued prosecution application filed under 37 CFR 1.53(d), and is subject to the twenty year patent term provisions of 35 U.S.C. 154(a)(2).

[21] Appl. No.: 08/585,679

[22] Filed: Jan. 16, 1996

Related U.S. Application Data

[63] Continuation of application No. 08/485,493, Jun. 7, 1995, abandoned.

[51] Int. Cl.⁶ ...................................................... G06F 13/00
[52] U.S. Cl. ......................................................... 395/200.51
[58] Field of Search ........................ 395/200.01, 200.02, 395/200.03, 200.05, 200.09, 200.15, 200.19, 608, 610, 617, 670, 182.02, 182.08, 182.18, 200.35, 200.33, 200.47, 200.49, 676, 200.59, 200.3, 200.31, 200.51

[56] References Cited

U.S. PATENT DOCUMENTS

| | | | |
|---|---|---|---|
| 4,432,057 | 2/1984 | Daniell et al. | 707/8 |
| 4,799,156 | 1/1989 | Shavit et al. | 705/26 |
| 4,800,488 | 1/1989 | Agrawal et al. | 395/200.55 |
| 4,899,136 | 2/1990 | Beard et al. | 345/156 |
| 4,914,571 | 4/1990 | Baratz et al. | 707/10 |

(List continued on next page.)

OTHER PUBLICATIONS

So . . . Just What is this First Class Thing Anyway? (visited Oct. 10, 1995) <http://orion.edmonds.wednet.edu/ESD/FC/AboutFC.html>.

Custer, Helen, "The Object Manager and Object Security," *Inside Windows NT*, Chapter 3, 40–43, 49–81 (1993).

Heylighen, Francis, "World–Wide Web: A Distributed Hypermedia Paradigm for Global Networking," Proceedings of the SHARE Europe Spring Conference, 355–368 (1994).

International Telecommunication Union, *CCITT Blue Book Volume VIII Data Communication Networks Directory*, 3–18 (1989).

King, Adrian, "The User Interface and the Shell," *Inside Windows 95*, Chapter 5 (1994).

(List continued on next page.)

*Primary Examiner*—Moustafa M. Meky
*Attorney, Agent, or Firm*—Leydig, Voit & Mayer, Ltd.

[57] ABSTRACT

A generic transaction replication service receives update transactions from individual application servers, and forwards the update transactions for processing to all application servers that run the same service application, thereby enabling each application server to maintain a replicated copy of service content data. Upon receiving an update transaction, the application servers perform the specified update, and asynchronously report back to the transaction replication service on the "success" or "failure" of the transaction. When inconsistent transaction results are reported by different application servers, the transaction replication service uses a voting scheme to decide which application servers are to be deemed "consistent," and takes inconsistent application servers off-line for maintenance. Each update transaction replicated by the transaction replication service is stored in a transaction log. When a new application server is brought on-line, previously-dispatched update transactions stored in the transaction log are dispatched in sequence to the new server to bring the new server's content data up-to-date.

21 Claims, 13 Drawing Sheets

U.S. PATENT DOCUMENTS

| | | | |
|---|---|---|---|
| 5,079,765 | 1/1992 | Nakamura | 370/401 |
| 5,140,689 | 8/1992 | Kobayashi | 395/182.18 |
| 5,151,989 | 9/1992 | Johnson et al. | 707/10 |
| 5,187,790 | 2/1993 | Fast et al. | 395/684 |
| 5,247,676 | 9/1993 | Ozar et al. | 395/684 |
| 5,257,369 | 10/1993 | Skeen et al. | 395/680 |
| 5,265,250 | 11/1993 | Andrade et al. | 395/671 |
| 5,291,597 | 3/1994 | Shorter et al. | 364/228.2 |
| 5,307,490 | 4/1994 | Davidson et al. | 395/684 |
| 5,321,841 | 6/1994 | East | 395/677 |
| 5,329,619 | 7/1994 | Page et al. | 395/200.33 |
| 5,341,477 | 8/1994 | Pitkin et al. | 395/200.56 |
| 5,347,632 | 9/1994 | Filepp et al. | 395/200.32 |
| 5,355,497 | 10/1994 | Cohen-Levy | 707/200 |
| 5,367,621 | 11/1994 | Cohen et al. | 395/821 |
| 5,371,852 | 12/1994 | Attanasio | 395/200.75 |
| 5,388,255 | 2/1995 | Pytlik et al. | 707/4 |
| 5,396,626 | 3/1995 | Nguyen | 395/701 |
| 5,423,003 | 6/1995 | Berteau | 370/254 |
| 5,434,994 | 7/1995 | Shaheen et al. | 395/200.33 |
| 5,444,848 | 8/1995 | Johnson et al. | 395/200.71 |
| 5,455,932 | 10/1995 | Major et al. | 711/162 |
| 5,463,625 | 10/1995 | Yasrebi | 370/401 |
| 5,473,599 | 12/1995 | Li et al. | 370/219 |
| 5,475,819 | 12/1995 | Miller et al. | 395/200.33 |
| 5,481,720 | 1/1996 | Loucks et al. | 395/187.01 |
| 5,483,652 | 1/1996 | Sudama et al. | 707/10 |
| 5,490,270 | 2/1996 | Devarakonda et al. | 707/201 |
| 5,491,800 | 2/1996 | Goldsmith et al. | 395/200.51 |
| 5,491,817 | 2/1996 | Gopal et al. | 707/200 |
| 5,491,820 | 2/1996 | Belove et al. | 395/200.33 |
| 5,497,463 | 3/1996 | Stein et al. | 395/200.33 |
| 5,499,342 | 3/1996 | Kurihara et al. | 395/200.57 |
| 5,500,929 | 3/1996 | Dickinson | 345/356 |
| 5,513,314 | 4/1996 | Kadasamy et al. | 364/245.3 |
| 5,515,508 | 5/1996 | Pettus et al. | 395/200.33 |
| 5,526,491 | 6/1996 | Wei | 395/200.33 |
| 5,530,852 | 6/1996 | Meske et al. | 395/200.36 |
| 5,544,313 | 8/1996 | Shachanai et al. | 395/200.49 |
| 5,544,327 | 8/1996 | Dan et al. | 395/200.64 |
| 5,548,724 | 8/1996 | Akizawa et al. | 395/200.33 |
| 5,548,726 | 8/1996 | Pettus | 395/200.33 |
| 5,553,239 | 9/1996 | Heath et al. | 395/187.01 |
| 5,553,242 | 9/1996 | Russell et al. | 395/200.57 |
| 5,559,969 | 9/1996 | Jennings | 395/307 |
| 5,564,043 | 10/1996 | Siefert | 707/103 |
| 5,572,643 | 11/1996 | Judson | 395/200.48 |
| 5,581,753 | 12/1996 | Terry et al. | 395/200.59 |
| 5,592,611 | 1/1997 | Midgely et al. | 395/182.02 |
| 5,596,579 | 1/1997 | Yasrebi | 395/684 |
| 5,596,744 | 1/1997 | Dao | 707/10 |
| 5,608,865 | 3/1997 | Midgely et al. | 395/180 |
| 5,608,903 | 3/1997 | Prasad et al. | 707/10 |
| 5,617,568 | 4/1997 | Ault et al. | 707/101 |
| 5,617,570 | 4/1997 | Russell et al. | 395/684 |
| 5,619,632 | 4/1997 | Lamping et al. | 345/441 |
| 5,650,994 | 7/1997 | Daley | 370/259 |
| 5,666,519 | 9/1997 | Hayden | 395/500 |
| 5,675,723 | 10/1997 | Ekrot et al. | 395/182.02 |
| 5,675,796 | 10/1997 | Hodges et al. | 395/670 |
| 5,696,895 | 12/1997 | Hemphill | 714/13 |
| 5,774,668 | 6/1998 | Choquire et al. | 395/200.53 |

OTHER PUBLICATIONS

PR Newswire Association, Inc., "America On–line Publicly Previews World Wide Web Browser," *Financial News Section* (May 9, 1995).

Silberschatz, et al., *Operating System Concepts*, $4^{th}$ Ed., 361–380, 431–457 (1994).

George Coulouris, et al., Chapter 14 "Distributed Transactions", pp. 409–421, Distributed Systems Concepts and Design, Second Edition ©1994.

"Replication data", Edelstein, Herb, DBMS, V6, N6, P59(4), Jun. 1993.

"Users give green light for replication", Wayne Eckerson, Network World, Jul. 19, 1993.

"Microsoft and Sybase are adding their unique touches to SQL Serves" Herb Edelstein, INFORMATIONWEEK, 1995, n528, PG62.

"The challenge of replication", Edelstein, Herb, DBMS,V8, N4,P62(4) Apr. 1995.

"Data replication in a distributed heterogenous database environment", by Yongdong Wang, IEEE, 1994.

"Sybase lays out blueprint for client/server networks", by Pallatto, John, PC Week, V9, N46, P6(1), Nov. 16, 1992.

"RDBMS server choice get tougher", by Michael Goulde, Networks World, P52, May 23, 1994.

"Sybase To Enhance RDBMS", by Dan Richman, Open Systems Today, 1992, N111.

"Sybase server to add complexity users face challenge with data replication", by John Cox, Communications Week, 1993, n 483.

"Window Consistent Replication for Real–time Applications", by Jennifer Rexford, IEEE 1994.

"Replicated data in a distributed Environment", by Malcolm Colton, IEEE 1993.

"The effect of workload on the performance and availability of voting algorithms", by Qureshi, IEEE 1995.

"Session Guarantees for Weekly Consistent Replicated Data", by Douglas Terry, IEEE 1994.

Dispatcher:

```
802 {  Set_Server_State ( Synchronizing ) ;
       Introduce_Arbiter_to_Server ( &CheckPoint ) ;
       if   (CheckPoint not within Transaction Log ) {
            ShutDownServer ;
       }

804 {  do {
          if ( Synchronizing && Server_Up_To_Date ( CheckPoint ) ) {
             Set_Server_State ( ServiceNormalState ) ;
          }
          Trans = GetNextTransaction ( CheckPoint ) ;
          Status = SendTransactionToServer ( Trans ) ;
             ServerOK = CheckForConflicts ( Trans, Status ) ;
          if ( Server OK ) {
             CheckPoint = Trans ;
          } else {
             ShutDownServer ( ) ;
          }
       } until (Arbiter or server down ) ;
```

FIG. 8

```
class CArbSup
{
public:
    //////////////////////////////////////////////
    //
    //      Outbound requests (calls to Arbiter) - This is the Arbiter API
    //
    //////////////////////////////////////////////
    //
    //      Replicate buffer contents
    //
    BOOL    FReplicateBuffer ( PVOID pv , DWORD dwSize, PTRID ptrid, PDWORD
                pdwError ) ;
    //
    //      Replicate one file
    //
    BOOL    FReplicateFile ( PSTR szPath, PVOID pv, DWORD dwSize, PTRID ptrid,
                PDWORD pdwError) ;
    //
    //      Replicate directory
    //
    BOOL    FReplicateDir ( PSTR szPath, PVOID pv, DWORD dwSize, PTRID ptrid,
                PDWORD pdwError) ;
    //
    //      Get transaction status
    //
    BOOL    FStatus ( TRID trid, PDWORD pdwStatus, BOOL* pfPending, PDWORD
                pdwError ) ;
    //
    //      Increment
    //
    BOOL    FIncrement ( DWORD dwIndex, DWORD dwAmount, LARGE_INTEGER* pli,
                PDWORD pdwError ) ;
    //
    //      Get state
    //
    BOOL    FServerState ( SERVER_STATE* pss, PDWORD pdwData, PDWORD pdwError
                ) ;
private :
    //////////////////////////////////////////////
    //
    //      Inbound requests (calls from Arbiter)
    //
    //////////////////////////////////////////////
    //
    //      Do transaction in buffer - return status
    //
    virtual         DWORD DoTransactionBuffer ( BOOL fAuditor, DWORD dwStatus,
                        TRID trid, PVOID pv, DWORD dwSize, PTRID ptridChkPnt ) ;
    //
    //      Do transaction in file - return status
    //
    virtual         DWORD DoTransactionFile ( BOOL fAuditor, DWORD dwStatus, TRID
                        trid, PSTR, szPath, PSTR szOriginalName, PVOID pv,
                        DWORD dwSize, PTRID ptridChkPnt ) ;
    //
    //      Do transaction in directory - return status
    //
    virtual         DWORD DoTransactionDir ( BOOL fAuditor, DWORD dwStatus, TRID
                        trid, PSTR szPath, PSTR szOriginalName, PVOID pv,
                        DWORD dwSize, PTRID ptridChkPnt ) ;
};
```

FIG. 9

```
typedef struct _TRANSACTION_FILE {
        DWORD      Version;           //  Arbiter version
        FILETIME   timePosted;        //  Time transaction posted
        FILETIME   timeReplicated;    //  Time of first replication
        FILETIME   timeStatusKnown;   //  Time status known
        RPC_TRANSACTION  trans;                //  RPC Transaction
} TRANSACTION_FILE;
```

Where:

```
typedef struct _RPC_TRANSACTION {
        DWORD dwAppGroup ;    //   AppGroup (i.e., service group)
        DWORD dwTransaction ; //   Transaction number
        DWORD dwFlags ;       //   Transaction Flags
        DWORD dwStatus ;      //   Transaction status
        DWORD dwSize :        //   Buffer size
        BYTE  Buffer [ ] ;    //   Buffer
} RPC_TRANSACTION ;

//
//      Transaction flags :
//
#define TRANSACTION_BUFFER           0x00000001
#define TRANSACTION _FILE            0x00000002
#define TRANSACTION_DIRECTORY        0x00000004
#define TRANSACTION_COMPLETED        0x00000010
#define TRANSACTION_PENDING          0x00000020

//
//    Predefined transaction status codes. All codes from 0x00000001 to
//    0x0FFFFFFF are defined by the particular service.
//
#define TRANSACTION_STATUS_SUCCESS         0x00000000
#define TRANSACTION_STATUS_ERROR           0xFFFFFFFF
#define TRANSACTION_STATUS_NOT_PROCESSED   0xFFFFFFFE
#define TRANSACTION_STATUS_REPEAT          0xFFFFFFFD
```

FIG. 10

TRANSACTION REPLICATION SYSTEM AND METHOD FOR SUPPORTING REPLICATED TRANSACTION-BASED SERVICES

RELATED APPLICATION

This is a continuation of U.S. Appl. Ser. No. 08/485,493, filed Jun. 7, 1995, of the same title, now abandoned.

FIELD OF THE INVENTION

The present invention relates to distributed, client-server type computer networks. More particularly, the present invention relates to computer networks which use replicated server applications to provide client access to replicated copies of service content data.

BACKGROUND

In a concurrently filed application having the title ARCHITECTURE FOR SCALABLE ON-LINE SERVICES NETWORK, there is disclosed a client-server architecture in which service applications are distributed and replicated across groups (referred to as "service groups") of application servers. Within a service group, each application server independently runs the service application that implements the server portion of the corresponding on-line service. When an end user opens the on-line service, the user is assigned to one of the application servers within the service group, and that application server processes service requests initiated by the user until the on-line service is closed by the user. Advantageously, the architecture is capable of handling tens of thousands of simultaneous user connections. Further, the architecture permits application servers to be efficiently reallocated to different service groups to accommodate for changes in the usage levels of different on-line services.

Certain types of on-line services on the network provide user access to service content data that is updated by the on-line service on a transaction-by-transaction basis. For example, a Bulletin Board System (BBS) service allows users to read and download messages, and allows users to post new messages for review by other users. For performance reasons, it is desirable to have each replicated service application maintain a duplicate copy of such service content data on its respective application server. This enables each application server to provide read-only access to the service content data without accessing other servers. For example, when a user requests to view a BBS message, the BBS server to which the user is assigned can provide access to the message without having to access an external database.

To achieve this objective, some mechanism is needed to ensure that all replicated service applications (each running on a respective server) update their locally-stored copies of the service content data in a consistent manner, so that all application servers of the service group contain like content. Stated differently, a mechanism is needed to "synchronize" the independently-running service applications, so that all service applications provide access to identical data, and so that the on-line service appears the same to all end users.

One replication technique which is commonly used in the art of distributed databases is known as the "two-phase commit" protocol. Under this protocol, updates to replicated data sets on different servers are made in two phases. During the first phase, a "coordinator" informs the other servers of the update, and each server returns a message to the coordinator indicating whether or not that server can perform the update. During the second phase, the coordinator decides, based on the responses of the other servers (plus its own vote), whether or not the update can be made, and then instructs the other servers of the decision. If all of the servers have indicated that the update can be performed, the coordinator instructs the servers to perform the update. Otherwise, the coordinator instructs the other servers to abort the update. The two-phase commit protocol is further described in George Coulouris et al, *Distributed Systems, Concepts and Design, Second Ed.*, (Addison Wesley publishing Co., 1994), pp. 414–421.

One problem with the two-phase commit protocol is that it is poorly suited for an on-line services network that handles large numbers of concurrent user connections. For on-line services that receive and process large numbers (hundreds of thousands to millions) of update requests per day, the two-phase commit method would create a bottleneck, degrading the quality of the on-line service from the perspective of end users. What is needed, therefore, is a mechanism for efficiently processing update requests made to replicated, transaction-based services.

What is also needed is an efficient mechanism for bringing the content of an application server up-to-date with that of other application servers, so that new application servers can be added to service groups (when, for example, application servers are reallocated to different service groups), and so that existing application servers can efficiently be taken off-line for maintenance.

SUMMARY OF THE PREFERRED EMBODIMENTS

In accordance with the present invention, a transaction replication service, referred to herein as the "Arbiter," provides generic transaction replication services for services on the network (including on-line services, such as the BBS service) that maintain replicated copies of some or all of their service content data across groups of application servers.

The Arbiter includes a transaction replication feature which allows services to rapidly and efficiently replicate transactions across the application servers of their respective service groups. Services can use this feature to perform updates to replicated copies of service content data. Different on-line services can advantageously use the Arbiter's transaction replication feature for different purposes. For example, the BBS service uses the Arbiter to replicate BBS message postings (across the application servers of a BBS service group), and a MEDIAVIEW service uses the Arbiter to add, delete and modify multimedia titles that can be viewed by end users.

The Arbiter also includes a conflict resolution feature for resolving transaction processing conflicts between application servers. When different application servers of a service group process the same update transaction differently, the Arbiter resolves the conflict by determining the "final outcome" of the transaction for the service group as a whole, and by taking any application servers off-line that are in conflict with this final outcome. The Arbiter thereby ensures consistency between the replicated copies of service content data stored on the different application servers, and, in the case of an on-line service, ensures that all end users of the service "see" the same content data.

The Arbiter also provides a "roll forward" feature for bringing the service content data stored on an application server up-to-date with other application servers of the service group. In accordance with the roll forward feature, update transactions that are "missed" by an application server (when, for example, the application server is temporarily taken down for maintenance) are submitted to the application server (in the same order the transactions were previously replicated within the service group) to thereby "synchronize" the application server with the other application servers of the service group. Once the content of the application server is brought up-to-date, the application server is placed in a state which allows it to receive client requests. Advantageously, the roll forward process does not consume the processing resources of the existing application servers of the service group.

In the preferred embodiment, each service group that uses the Arbiter preferably has a dedicated Arbiter microcomputer associated with it, which runs the Arbiter service application and performs replication services for the corresponding service group. The use of a separate replication service running on a dedicated microcomputer essentially frees the on-line services (and application servers) from the task of managing the replication process. Thus, for example, if a failure occurs in the software used to manage updates to replicated content data, the end user is shielded from the failure, and can continue to use the service.

In accordance with a preferred transaction replication technique, when an application server of a service group receives a client request that indicates a modification to replicated service content data, the server/service generates an update transaction and sends the update transaction to the Arbiter. The Arbiter records the update transaction in a service-group-specific transaction log (stored on the hard disk of the associated Arbiter microcomputer), and forwards the transaction for immediate processing to every application server in the service group (including the application server that generated the transaction). The application servers process the update transaction, and return status codes indicating, for each respective application server, the "success" or "failure" of the transaction. Because transactions are processed immediately, message traffic over the local area network is significantly less than would be possible with the two-phase commit protocol. When different application servers return different status codes, the Arbiter uses the above-described conflict resolution feature to resolve the conflict.

BRIEF DESCRIPTION OF THE DRAWINGS

These and other features of the invention will now be described with reference to the drawings of a preferred embodiment, which is intended to illustrate and not to limit the invention, and in which:

FIG. 8 illustrates a basic software structure used to implement one of the dispatchers of FIG. 7;

FIG. 9 illustrates the methods used by service applications to place calls to the Arbiter service, and the methods used by the Arbiter to send transactions to application servers;

FIG. 10 illustrates the structure of transaction log files that are stored within the Arbiter transaction logs of FIG. 7;

Figure 1:
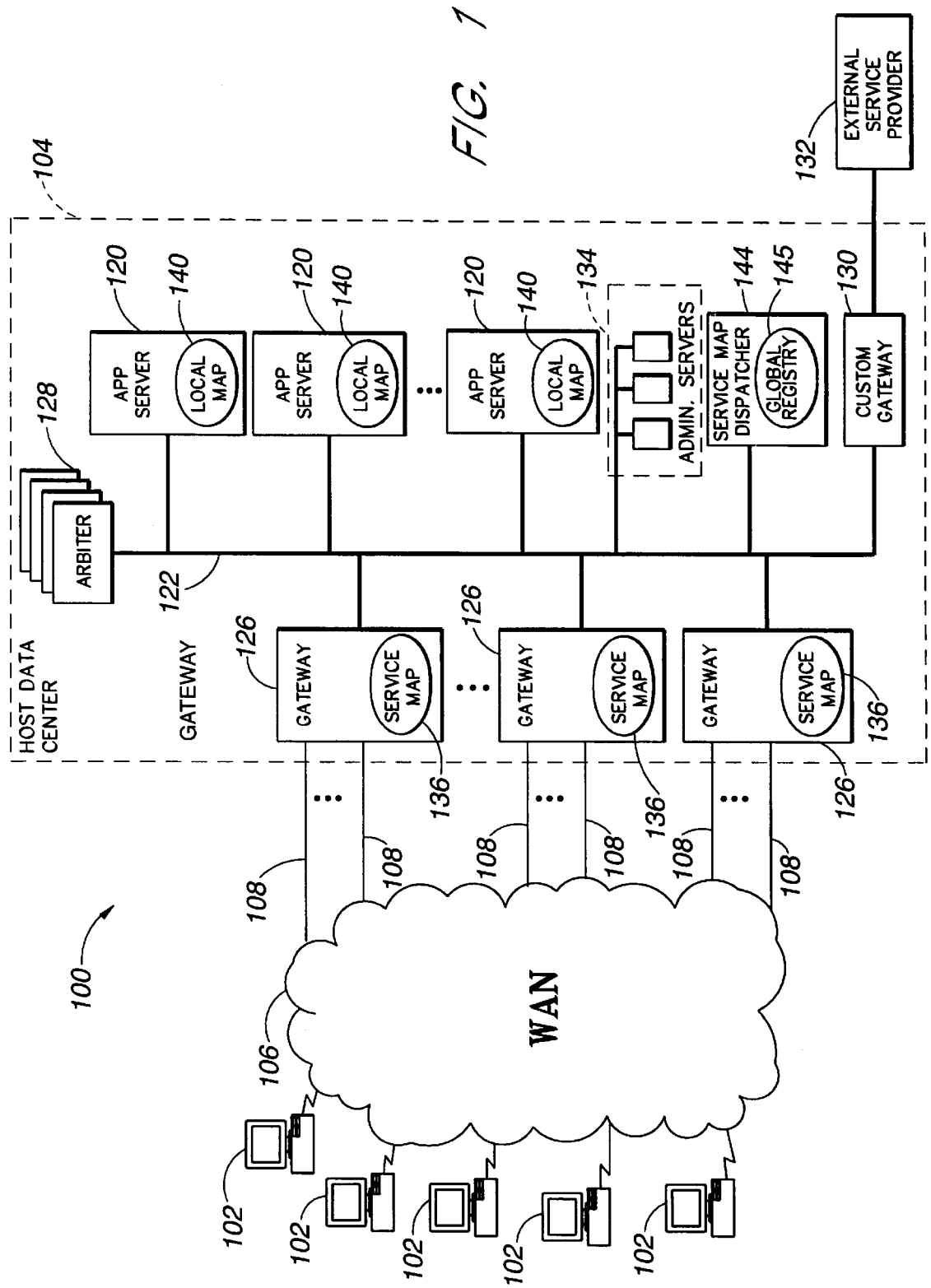
FIG. 1 is a high level diagram illustrating the architecture of an on-line services network in which a preferred embodiment of a transaction replication system and method are employed.

Reference numbers in the drawings have three or more digits; the two least significant digits are reference numbers within the drawing, and the more significant digits indicate the figure in which the item first appears. For example, reference number 516 refers to item 16, which is first shown in FIG. 5. Like reference numbers indicate like or functionally similar components.

DETAILED DESCRIPTION OF A PREFERRED EMBODIMENT

Described herein is a system and method for enabling replicated, transaction-based service applications to efficiently maintain replicated copies of service content data on different application servers. This system and method are embodied within a generic replication service which is referred to herein as the "Arbiter."

In the preferred embodiment, the Arbiter is adapted for use in an on-line services network that uses replicated application servers to provide on-line services to end users. It will be recognized, however, that various aspects of the Arbiter system are applicable outside the context of on-line services networks.

For convenience, the description of the preferred embodiment is broken up into the following 17 sections: ARCHITECTURAL OVERVIEW; SERVICE GROUPS; SERVICE MAP; COMMUNICATIONS COMPONENTS; SOFTWARE IMPLEMENTATION OF SERVICES ON SERVERS; ARBITER OVERVIEW; AUDITORS; SERVER STATES; ARBITER STRUCTURE; TRANSACTIONS AND TRANSACTION TYPES; ARBITER INTERFACE; STATUS CODES AND CONFLICT RESOLUTION; TRANSACTION LOG; SERVER STARTUP; ARBITER STARTUP; ARBITER FAILURE; and CONCLUSION. The first three of these sections describe the architecture of the on-line services network. This architecture is further described in the above-referenced application having the title "ARCHITECTURE FOR SCALABLE ON-LINE SERVICES NETWORK," which is incorporated herein in its entirety by reference. The remaining sections are directed primarily to a preferred implementation of the Arbiter service.

1. Architectural Overview

FIG. 1 is a high level diagram illustrating the basic components of an on-line services network 100 for which the Arbiter of the present invention provides various replication-related services. Multiple client microcomputers 102 are connected to a host data center 104 by a wide area network (WAN) 106. The wide area network 106 includes WAN lines 108 which are provided by one or more telecommunications providers, and which allow end users (i.e., users the microcomputers 102) over a wide geographic area to access the host data center 104 via modem. The WAN lines 108 preferably include both X.25 lines and ISDN (Integrated Service Digital Network) lines.

The X.25 lines 108 comply with the X.25 specification of the Comité Consultatif Internaionale de Télégraphie et Téléphonie (CCITT)—an international standards organization in Geneva, Switzerland that recommends communications standards. The X.25 standard documents the interface required to connect a computer to a packet-switched network. In addition to or in place of X.25, the wide area network 106 may use other types of communications standards, such as Frame Relay, or the Transport Control Protocol/Internet Protocol ("TCP/IP"—a suite of protocols developed for use on the Internet).

The host data center 104 comprises a plurality of application servers (APP servers) 120 connected to a high speed local area network (LAN) 122 (which may include multiple LANs, as described below). Each application server 120 has a unique server ID associated with it. Also connected to the LAN 122 are multiple Gateway microcomputers 126 (hereinafter "Gateways"), which link incoming calls from end users to the application servers 120. In the preferred embodiment, the application servers 120 and the Gateways are Pentium-class (or better) microcomputers which are scalable to at least four central processing units (CPUs), and which run the Microsoft Windows NT operating system available from Microsoft Corporation. The application servers 120 will typically have at least 128 MB of random-access memory (RAM) and at least 4 GB of disk space. Processing power may vary from application server to application server. For example, one application server may have four 120 MHz microprocessors, while another application server may have one 90 MHz microprocessor. Each Gateway 126 will typically have at least 64 MB of RAM and at least 2 GB of disk space, and will be capable of supporting approximately 1000 simultaneous user connections.

It is envisioned that the host data center 104 may advantageously have on the order of one hundred Gateways 126, and between several hundred to several thousand application servers 120. A host data center of this type will be able to handle tens of thousands of simultaneous user logon sessions. Advantageously, the processing capacity of the host data center 104 can easily be increased (to support increases in the number of subscribers, for example) by connecting additional Gateways 126 and application servers 120 to the LAN 122, adding additional LANs when necessary. Further, additional host data centers 104 can be provided at different geographical locations to accommodate a wide geographic distribution of subscribers. The multiple host data centers 104 would preferably be interconnected by leased lines and/or by a data network (such as the Internet), and would preferably use TCP/IP to communicate.

The local area network 122 preferably comprises at least one 100 Mbps LAN which is based on the ISO/ANSI Copper Distributed Data Interface (CDDI) specification. (The CDDI specification is a variant of the well-known ANSI Fiber Distributed Data Interface specification, but uses a single copper ring instead of a dual fiber ring.) Various other types of LAN specifications may be used, such as IEEE token ring or switched ethernet. Further, various alternative transmission mediums may be used, including fiber optic lines.

To increase LAN bandwidth, some or all of the microcomputers of the host data center 104 may be interconnected by one or more additional LANs. For example, different LANs may be dedicated to different sets of application servers 120 (and to different services). Accordingly, the term "local area network" (or "LAN"), as used herein, should be construed to include a combination of local area networks, and should not be construed to be limited to a particular data transfer protocol or transmission medium.

The host data center 104 provides a variety of communications-based and information-based on-line services to end users. Typical services include, for example, a mail service for allowing users to send email messages to one another, a bulletin board system (BBS) service for allowing users to post and review messages on specific topics, a chat service for allowing users to communicate in real time with each other on specific topics, an interactive games service for allowing users to compete against each other in real time in on-line interactive games, various news services for allowing users to access news and magazine articles, a mediaview service for allowing users to view on-line multimedia titles, and a directory service for allowing users to view a hierarchy of services and data entities on the network. As described below, the server side of each on-line service is preferably implemented using one of the following: (1) a single application server 120, (2) a set of "replicated" application servers (i.e., application servers which run the same service application or applications) that provide access to replicated (and locally-stored) copies of service "content" data (i.e., data provided to end user's of the service), or (3) a set of replicated application servers that provide access to server-specific (non-replicated) service content data.

The host data center 104 also includes multiple Arbiter microcomputers 128 that run the Arbiter service application. In the preferred embodiment, each Arbiter microcomputer 128 has two CPUs, 256 megabytes of main memory, and includes a 2.1 gigabyte hard disk for storing a transaction log.

The host data center 104 also includes one or more custom Gateway microcomputers 130 which link the host data center 104 to one or more external service providers 132, such as a credit card service that validates and executes credit card transactions. Each custom Gateway microcomputer 130 uses the communications protocol required by the external service provider 132 to which the custom Gateway is linked. In other embodiments, the functionality of the custom Gateways 130 may be integrated into the application servers 120.

The host data center 104 also includes a number of administrative servers 134. The administrative servers 134 perform administrative functions such as accounting, billing, network management, backup, system security, performance analysis, and server-to-service allocation. Because the description that follows focusses primarily on the application servers 120 (rather than the administrative servers 134), the term "server" will hereinafter be used to refer to an application server 120 (unless indicated otherwise).

The on-line services offered to end-users of the network 100 are in the form of client-server applications programs (or "service applications"). Each service application includes a server portion (also referred to as a "server application") that runs on one or more of the servers 120, and a client portion (also referred to as a "client application") that runs on a microcomputer 102 of an end user.

In the presently preferred embodiment, the client applications are in the form of Microsoft Windows '95 executables. These client applications are preferably written such that, from the end user's perspective, the various on-line services provided by the host data center 104 appear transparently as an extension to the file structure of the user's hard disk. Server applications are preferably in the form of service dynamic link libraries (DLLs) that are executed by the application servers 120. In accordance with one feature of the architecture, service DLLs can be dynamically loaded and unloaded from the servers 120, thereby allowing different services to be efficiently (and automatically) activated and deactivated on different servers. Although the term "service application" will be used herein to describe applications running on servers 120, it should be understood that only a server portion of the service application is actually running on the servers 120, and that the service application also includes a client portion running on client microcomputers 102 (or running on other computers of the host data center 104 that act as clients).

The term "service" refers generally to the abstract function or functions performed by a particular service application (or group of related service applications). Services generally fall within two categories: "on-line" services that are "seen" by end users when running client applications on client microcomputers 102, and "background" services which are provided to other components of the host data center 104 (when, for example, one server 120 performs a function for another server 120.) Although much of the following description focusses on on-line services, it should be recognized that the various features of the invention are applicable to both on-line services and background services.

The architecture of the network 100 is characterized as having different servers 120 running different service applications. The various on-line services (and background services) are thus distributed among the servers 120 of the host data center 104. When a server runs a particular service application (or group of related service applications), it is said to be "allocated" to the corresponding service.

In accordance with one feature of the architecture, service applications are replicated across multiple servers to form "service groups." The servers of a service group run the same service application (or set of related service applications), and therefore implement the same service (or set of related services). Although multiple servers 120 may be allocated to the same service (or equivalently, to the same service group), a user of the service will normally be serviced by only one of the servers 120 of the service group.

In accordance with another feature of the architecture, when a particular service becomes heavily loaded, additional servers are allocated to the heavily-loaded service (by adding servers to the service group) to assist in handling the increased load. Allocations of servers to services can be performed either by a system operator who monitors the service loads from a control station, or by load monitoring software which compares service loads to predetermined thresholds.

To facilitate the operational description that follows, the following terminology and conventions will be used. The term "client-user" will be used to refer to a client microcomputer 102 under the control of an end user of the on-line services network 100. Names of specific on-line services (and on-line service applications) will be written in capital letters (for example, "CHAT" or "MAIL") , and names of background services will be written in mixed case (for example, "Arbiter" or "Conf_Loc"). The convention <service name>.DLL (for example, "CHAT.DLL") will be used to refer to specific dynamic link libraries used to implement the server portions of service applications. Further, the names of specific API methods will be provided in both bold print and mixed case (for example, FReplicateFile).

During a typical logon session, a client-user will maintain a communications link with a single Gateway 126, but may access multiple services (and thus communicate with multiple servers 120). To initially access a service, the client-user sends an "open" request to the service. To terminate a service, the client-user sends a "close" request to the service. The use of a particular service by a single client-user (from the opening of the service to the closing of the service) will be referred to herein as a "service session."

Each time the user opens a service, the Gateway 126 that is handling the logon session accesses a locally-stored service map 136 to select a server 120 that is allocated to the particular service, and then establishes a service instance channel with the selected server 120. The service instance channel is preferably in the form of a TCP/IP link, and is recorded in a session map 522 (shown in FIG. 5) on the Gateway 126.

The service instance channel is maintained throughout the service session, and is used to pass messages between the Gateway 126 and the server 120 as the client and server portions of the service application interact. When multiple simultaneous service sessions are established between a given Gateway 126 and a given server 120, the corresponding service instance channels are multiplexed over a single TCP/IP channel. Messages sent from the client microcomputer 102 to the server 120 are normally in the form of service requests (i.e., requests to have particular services performed by the server portion of the service application). Messages sent from the server 120 to the client microcomputer 102 are normally in the form of responses to specific service requests.

During a service session, the Gateway 126 performs two basic functions. First, the Gateway 126 performs protocol translation, translating messages between the protocol of the WAN 106 (such as X.25) and the protocol of the LAN 122. Second, the Gateway routes messages between WAN channels and LAN channels so as to maintain communications between the client microcomputer 102 and the selected server 120.

Figure 2:
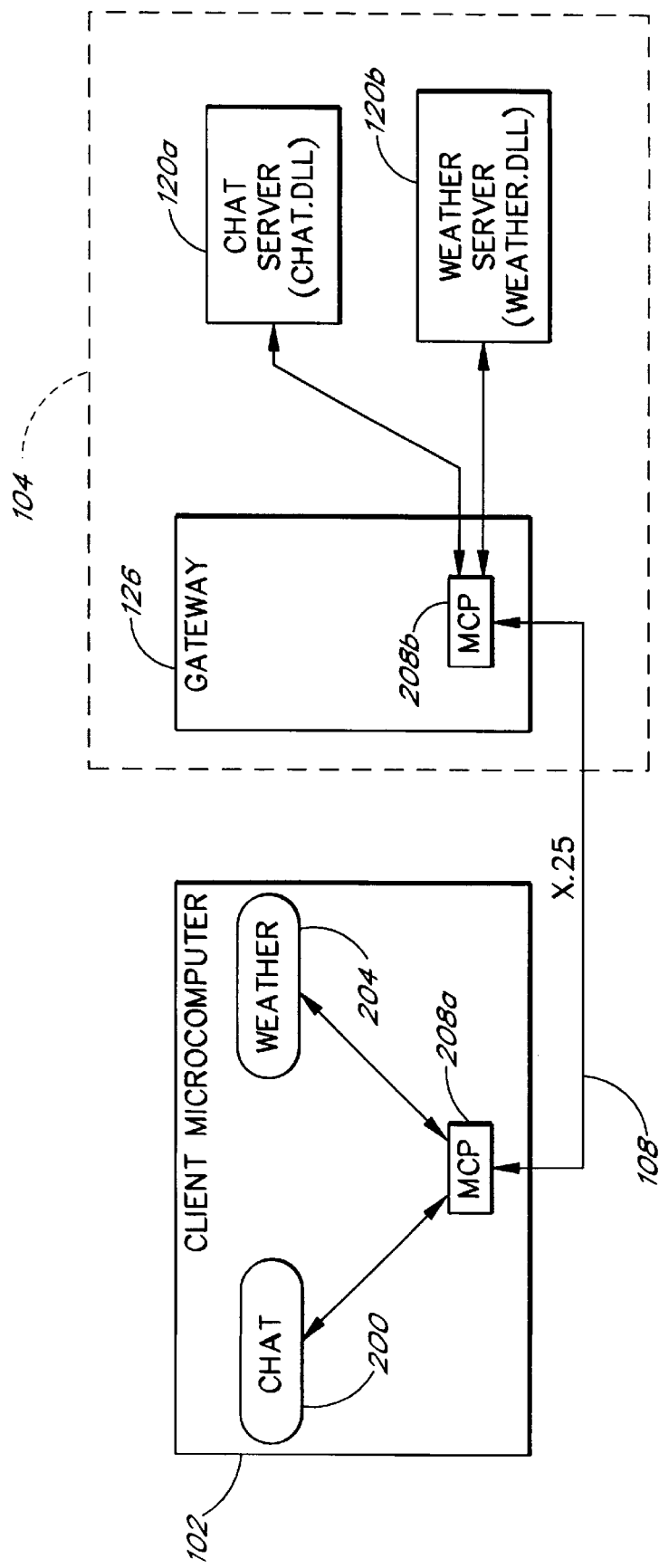
FIG. 2 illustrates a client microcomputer concurrently communicating with two different application servers in accordance with a multiplexing feature of the architecture of FIG. 1.

Advantageously, the preferred transport layer (referred to herein as the Microsoft Connection Protocol layer, or "MCP layer") that manages client-Gateway communications supports simultaneous service sessions, allowing a client-user to access multiple services simultaneously. Thus, for example, a user can access one on-line service while downloading a large software update file from another on-line service. This feature of the present invention is illustrated in FIG. 2 for a user who has opened two services, CHAT and WEATHER. The CHAT and WEATHER client applications 200 and 204 generate message streams that are passed to an MCP layer 208a that is running on the client microcomputer 102. The MCP layer 208a multiplexes (and packetizes) these two message streams and sends the multiplexed data to a Gateway 126 at the host data center 104. The MCP layer 208b running on the Gateway 126 demultiplexes the data, and routes the respective message streams (over the LAN 122) to the appropriate servers 120a and 120b. Likewise, the MCP layer 208b on the Gateway 126 multiplexes the message streams that are generated by the CHAT and WEATHER servers 120a and 120b, and the MCP layer 208a on the client microcomputer 102 demultiplexes these message streams and passes them to the respective client applications 200 and 204. In the example shown, the user could, for example, download a large bitmap image of a weather satellite photo while simultaneously communicating in real time with another CHAT user.

2. Service Groups

As indicated above, when multiple servers 120 are allocated to the same service they form what is referred to herein as a service group. The creation of a service group is desirable, for example, when the processing load placed on a service cannot be adequately handled by a single server 120. Normally, all servers 120 within a service group are replicated, meaning that they all run the same service application (or set of service applications) that implements the server portion of a particular service (or set of related services). Each client service session can thus be handled by a single server 120 within the service group.

For certain types of on-line services (examples of which as provided below), all replicated servers of the service group maintain local copies of the service's content data, and provide user access to such data. Because all such servers run like service applications and provide access to like service data, the service appears the same to all users, even though different user service sessions may be assigned (by the Gateways 126) to different servers 120 of the service group. As further described below, where the on-line service is such that the content data can be modified (by the replicated service applications running on the servers 120) on a transaction-by-transaction basis, the Arbiter service is used to ensure that all servers of the service group modify their content data in a consistent manner.

It should be recognized from the foregoing that although a service session will normally be handled by a single server 120, the entity that provides the service as a whole is the service group. The service performed by a service group can be either an on-line service (such as CHAT or MAIL), or a background service (such as the Conf_Loc service which is used to locate CHAT conferences, as described below).

Figure 3:
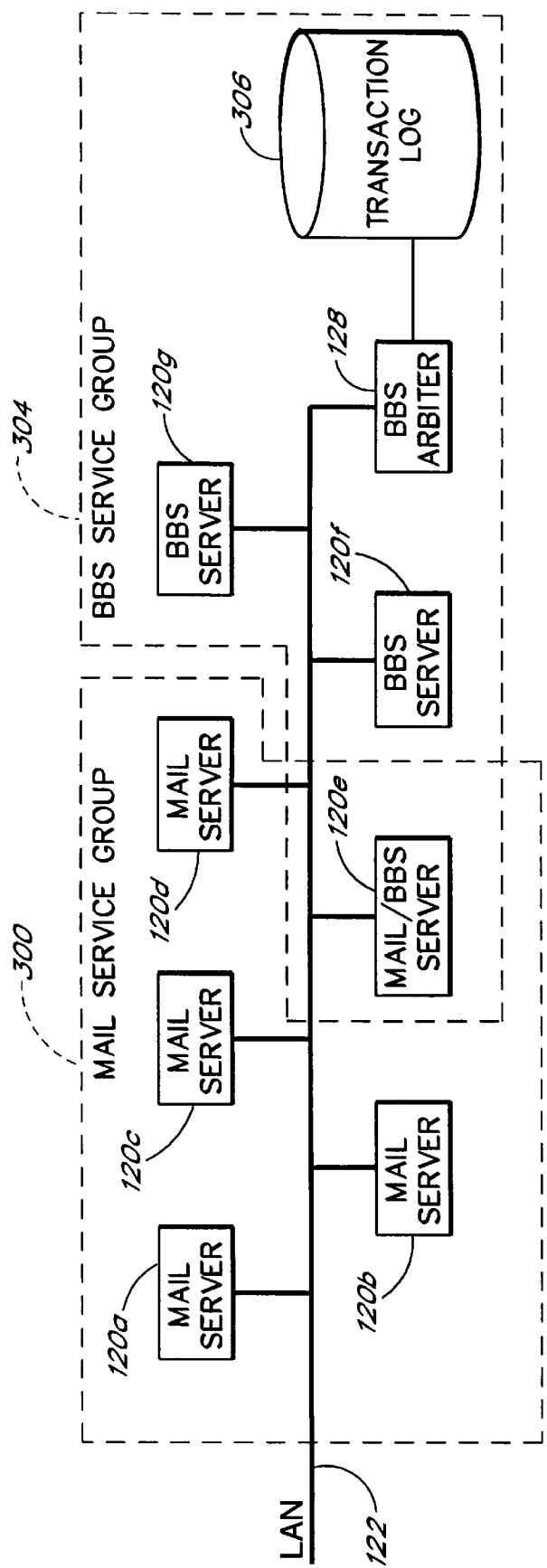
FIG. 3 illustrates, in example form, how different application servers can be assigned to different service groups.

An example allocation of servers 120 to services is illustrated in FIG. 3. In this example, four application servers 120*a–d* have been allocated solely to a MAIL service, and two application servers 120*f* and 120*g* have been allocated solely to a BBS service. Server 120*e* is allocated to both the MAIL service and the BBS service, and thus runs both MAIL and BBS service applications. In this example configuration, servers 120*a–e* fall within the MAIL service group 300, and servers 120*e–g* fall within the BBS service group 304. Further, servers 120*a–e* are all replicated of one another (meaning, in this example, that they all run the same MAIL service application), and servers 120*e–g* are all replicated of one another (meaning that they all run the same BBS service application).

As indicated above, some on-line services provide end users with access to service-wide (or equivalently, service-group-wide) data sets (also referred to generally as "service content data") which are updated by the replicated service applications on a transaction-by-transaction basis. The BBS service is an example of such a service; each time a user posts a message, a BBS data set is modified such that all users of the BBS service (regardless of the particular BBS server to which a user is assigned) have access to the message. Transactions of this general type (i.e., transactions which affect service-wide data sets) will hereinafter be referred to as "update transactions," and can originate from a variety of sources. For example, an update transaction can originate from a client microcomputer 102 when an end user posts a BBS message, from an external data provider that is connected to the host data center 104 by the Internet, or by a system operator who manages the BBS service.

Although service content data could be stored in a central data base which is accessible to all servers 120 of the corresponding service group, for performance reasons, it is normally preferable (depending upon the particular service) to have each server 120 of the service group locally store redundant copies of some or all of the service's content data. To ensure consistency between such locally-stored data sets (so that all users of the service see the same data), the Arbiter service is used to replicate update transactions across all servers 120 of a service group. In the preferred embodiment, the Arbiter service runs on the Arbiter microcomputers 128, and one Arbiter microcomputer 128 is allocated to each service (i.e., to each service group) that uses the Arbiter to replicate update transactions. In other embodiments, the Arbiter functionality may be implemented on one of the servers 120 of the corresponding service group. In still other embodiments, a single Arbiter process could be configured to service multiple service groups.

In the preferred implementation of the BBS service, the Arbiter service is used to replicate message postings. Thus, in the example configuration shown in FIG. 3, a BBS Arbiter 128 is allocated to the BBS service group 304. To accommodate increased numbers of BBS users, multiple BBS service groups (not shown) may be formed, with each BBS service group handling a specific topic or set of topics. A separate Arbiter microcomputer 128 would then preferably be used for each BBS service group.

In the preferred implementation of the MAIL service, each user is assigned to a particular MAIL server 120 (i.e., the user's mailbox is stored on only one MAIL server), and email messages directed to a user are forwarded to the user's MAIL server by the other MAIL servers. Thus, the replication services of the Arbiter service are not required, and no Arbiter is allocated to the MAIL service group 300.

The Arbiter service is further described in the sections that follow.

3. Service Map

Referring again to FIG. 1, in order to route client-user service requests to the appropriate servers 120, the Gateways 126 must have some way of determining the IDs of the servers that are currently handling the requested services. This is accomplished by means of the service map 136, which contains information about every service and server 120 in the host data center 104. The service map 136 also contains information about the current load of each server 120 in the host data center 104. This load information is used to uniformly distribute the service load among the servers 120.

Still referring to FIG. 1, the service map 136 is preferably generated by a service map dispatcher 144, which may be implemented on a single microcomputer. To generate the service map 136, each server 120 periodically generates a local map 140, and transmits the local map 140 to the service map dispatcher 144. Each local map 140 contains up-to-date information about the respective server 120 that generated the local map, including information about the server's current load. The service map dispatcher 144 builds the service map 136 from all of the local maps 140 it receives, and then broadcasts the service map 136 to all of the Gateways 136 over the LAN 122. In other embodiments, the servers 120 broadcast their respective local maps 140 to the Gateways 126, and each Gateway builds the service map 136 from the local maps it receives.

In the preferred embodiment, the service map dispatcher 144 broadcasts a new service map 136 every 30 seconds. Each time a new service map 136 is broadcasted, every Gateway 126 receives and locally stores a copy of the new service map 136, overwriting old versions of the service map. The Arbiter microcomputers 128 also receive and store copies of the service map 136, and use the service map to determine the states of the servers 120 that are currently assigned to the respective service groups.

Figure 4:
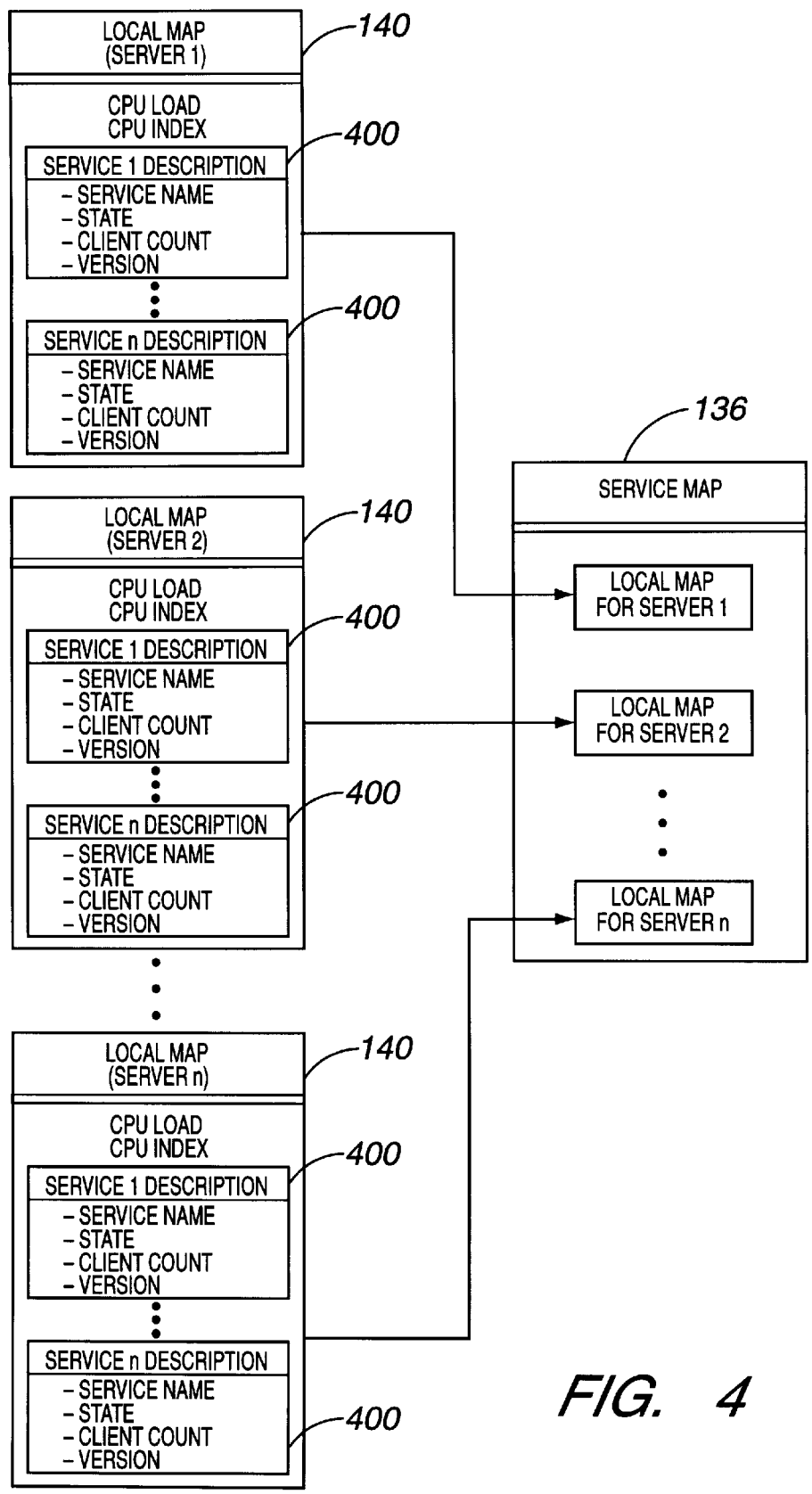
FIG. 4 illustrates a method of generating a service map from server-specific local maps.

FIG. 4 illustrates the information contained within each server-specific local map 140, and also illustrates the process by which the service map dispatcher 144 builds the service map 136 from the local maps 140. The service map 136 contains the local map 140 for each operational server 120 within the host data center 104, along with the corresponding server IDs (indicated by the numbers 1, 2, . . . n) for the servers 120.

Each local map 140 contains a CPU LOAD value and a CPU INDEX value for the respective server 120. The CPU LOAD indicates the current load of the server 120. The CPU LOAD is a numerical value, preferably ranging from 0 to 100, which indicates the percentage of available time that the CPU (or CPUs) of the server 120 is processing service requests. A CPU LOAD of zero indicates that the server 120 is minimally loaded, and a CPU LOAD of 100 indicates that the server is heavily loaded. In the preferred embodiment, the CPU LOAD is periodically calculated by the operating system (NT) on each server 120, and is taken as an average over a 5 second period. The CPU LOAD values contained in the local maps 140 are periodically updated to reflect changes in server loads.

The CPU INDEX is a static benchmark value, indicating the processing power of the particular server 120. In the preferred embodiment, the CPU INDEX is a benchmark that measures the server's performance under Microsoft Windows NT, although other conventional benchmarks could be used. The CPU INDEX accommodates for servers 120 of varying processing powers, and can be omitted in system configurations for which all servers 120 have substantially the same processing power. Together, the CPU LOAD and CPU INDEX for a server 120 indicate the available processing power for the server, and are thus useful for identifying the servers 120 that are most capable of handling new service sessions.

With further reference to FIG. 4, each local map 140 contains at least one service description 400, and contains multiple service descriptions 400 (as shown in FIG. 4) if the server 120 is currently allocated to multiple services. Each service description 400 includes a service name, the state of the service DLL (launching, active, active-accepting, or stopped), the client count (i.e., the number of client-users that are currently assigned to the server 120 to use the service), and the version number of the service DLL. The service descriptions 400 contained within the service map 136 are used for various purposes by different components of the host data center 104. For example, the service descriptions 400 are used by the Gateways 126 to locate servers 120 for handling client service requests.

The service map 136 advantageously serves as a means for automatically informing the Gateways 126 (and other components of the on-line services network 100) of the addition, deletion or change in state of any server 120 in the system. The use of the service map 136 thereby allows changes to be made to the servers 120 of the system without manual intervention. By way of example, assume that a new server 120 is added to the host data center 104, and is initially configured to act as a MAIL server. Shortly after being brought up, this new MAIL server will generate and send a local map 140 to the service map dispatcher 144. The service map dispatcher 144 will then broadcast the local map 140 (as part of the next service map 136) to all of the Gateways 126, allowing the Gateways to send service requests to the new MAIL server. Thus, once the new server 120 has been configured, its addition to the system is automatic, requiring no system operator intervention.

In addition to generating a service map 136, the service map dispatcher 144 maintains a central repository of information referred to as the "global registry" 145. The global registry 145 is preferably readable from every microcomputer of the host data center 104. Of course, the global registry 145 could be maintained by some entity other than the service map dispatcher 144.

The global registry 145 contains various information about the present configuration of the host data center 104, including a service group description for each existing service group in the host data center. The service group descriptions are used for various purposes by the Arbiter, as further described in the sections that follow.

4. Communications Components

Figure 5:
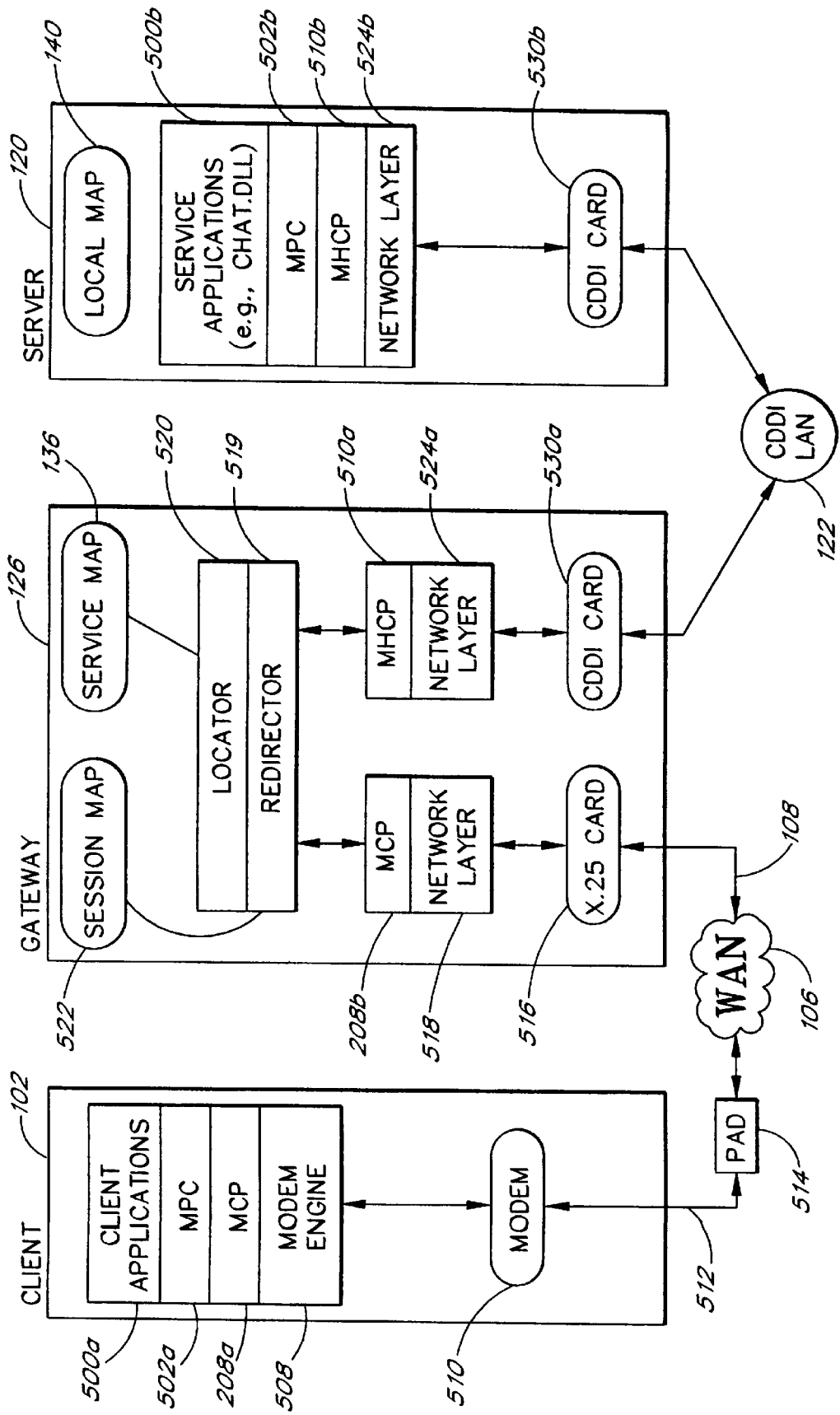
FIG. 5 illustrates the primary software and hardware communications components used for client-server connections in the network of FIG. 1.

FIG. 5 illustrates the basic communications components, including the protocol layers provided within the client, Gateway, and server microcomputers 102, 126, 120, for a preferred embodiment of the on-line-services network 100. Client applications 500a make use of a high-level application programming interface (API), referred to herein as the Microsoft Procedure Call layer, to communicate with server portions of service applications 500b. The Microsoft Procedure Call layer (hereinafter "the MPC layer") is generally similar to conventional remote procedure call (RPC) APIs, but is optimized to permit efficient client-server communications over a relatively slow WAN. For example, unlike RPC, the MPC layer allows a client application to send out multiple requests without receiving a response, and allows each request to be individually monitored and/or canceled from the client side. The MPC layer is shown in FIG. 5 as comprising respective layers 502a and 502b within the client microcomputer 102 and the server 120. (Depending upon the context in which it is used herein, the term "layer" may refer either to a specific set of structures and routines on a particular machine, or may refer to the general functionality of such structures and routines as a whole.)

Requests from the MPC layer 502a are passed to the MCP layer, which is shown in FIG. 5 as comprising respective layers 208a and 208b in the client microcomputer 102 and the Gateway 126. The MCP layer is seen by the MPC layer as providing reliable end-to-end client-Gateway communications. The MCP layer handles various aspects of client-Gateway communications, including packetization (for X.25 connections), segmentation and multiplexing of message streams, flow control (using a sliding window algorithm), and error correction (using CCITT CRC-32). In addition to supporting X.25, the MCP layer supports TCP/IP user connections. In accordance with one feature of the architecture, when a client-user concurrently accesses multiple services, the MCP layer allocates WAN bandwidth to services based on the differing throughput requirements of the services. In addition to implementing a preferred communications protocol, the MCP layer also includes a client API and a server API for interfacing respectively with client and server portions of service applications.

Assuming the client-user accesses the on-line services network 100 by a modem 510, the MCP layer 208a communicates with a modem engine layer 508, which in-turn communicates with the modem 510. (For user connections which do not use a modem, such as connections over ISDN lines, the modem engine layer 508 is replaced with a transport engine layer) The modem 510 communicates over a telephone line 512 with a carrier-provided PAD (packet assembler-disassembler) 514 that translates data between a standard modem format and the WAN format (which is X.25 in the FIG. 5 example). At the Gateway 126, an X.25 network card 516 sends and receives data over an X.25 line 108, and communicates with an X.25-specific network layer 518.

Within the Gateway 126, a redirector layer 519 communicates with a locator program 520. The redirector layer 519 and the locator program 520 perform the functions of (1) selecting servers 120 for handling requests to open services (referred to herein as "open" requests), and (2) routing the "open" requests so as to distribute processing loads within service groups. (As indicated above, a client-user will typically generate a number of "open" requests throughout a logon session, since the user will typically access multiple services. Additional service requests will normally be generated by the client-user throughout the course of each service session.) The locator program 520 accesses a locally-stored copy of the service map 136 whenever an "open" request is received from a client microcomputer 102. Each time a server 120 is selected to handle an open request, the redirector layer 519 records the selected server's ID within a session map 522. In the course of an ongoing service session, the Gateway 126 accesses its session map 522 whenever a client-server message is received, and uses the session map to properly route the message.

The redirector layer 519 communicates with the MCP layer 208b to communicate with client microcomputers 102, and communicates with a Microsoft Host Connection Protocol (MHCP) layer 510a to communicate with servers 120. The MHCP layers 510a and 510b perform various transport-layer-type functions, such as formatting of message data for transmission over the LAN 122, and multiplexing of message data for transmission over TCP/IP links of the LAN 122. The MHCP layers 510a, 510b communicate with CDDI network layers 524a and 524b, which inturn communicate with CDDI network cards 530a and 530b.

It will be recognized that although the implementation depicted by FIG. 5 uses specific communications protocols and protocol layers, various alternative protocols and protocol layers could be used.

5. Software Implementation of Services on Servers

As indicated above, server portions of service applications are preferably in the form of service DLLs (dynamic link libraries) which run under the Microsoft Windows NT operating system. Typically, a server 120 will be assigned to only a single service at a time. However, as indicated above, one server 120 can run multiple service applications concurrently, and can thus be assigned to two or more services simultaneously. The ability for a server 120 to handle multiple services concurrently advantageously allows hardware resources to be allocated to services with a high degree of granularity.

Figure 6:
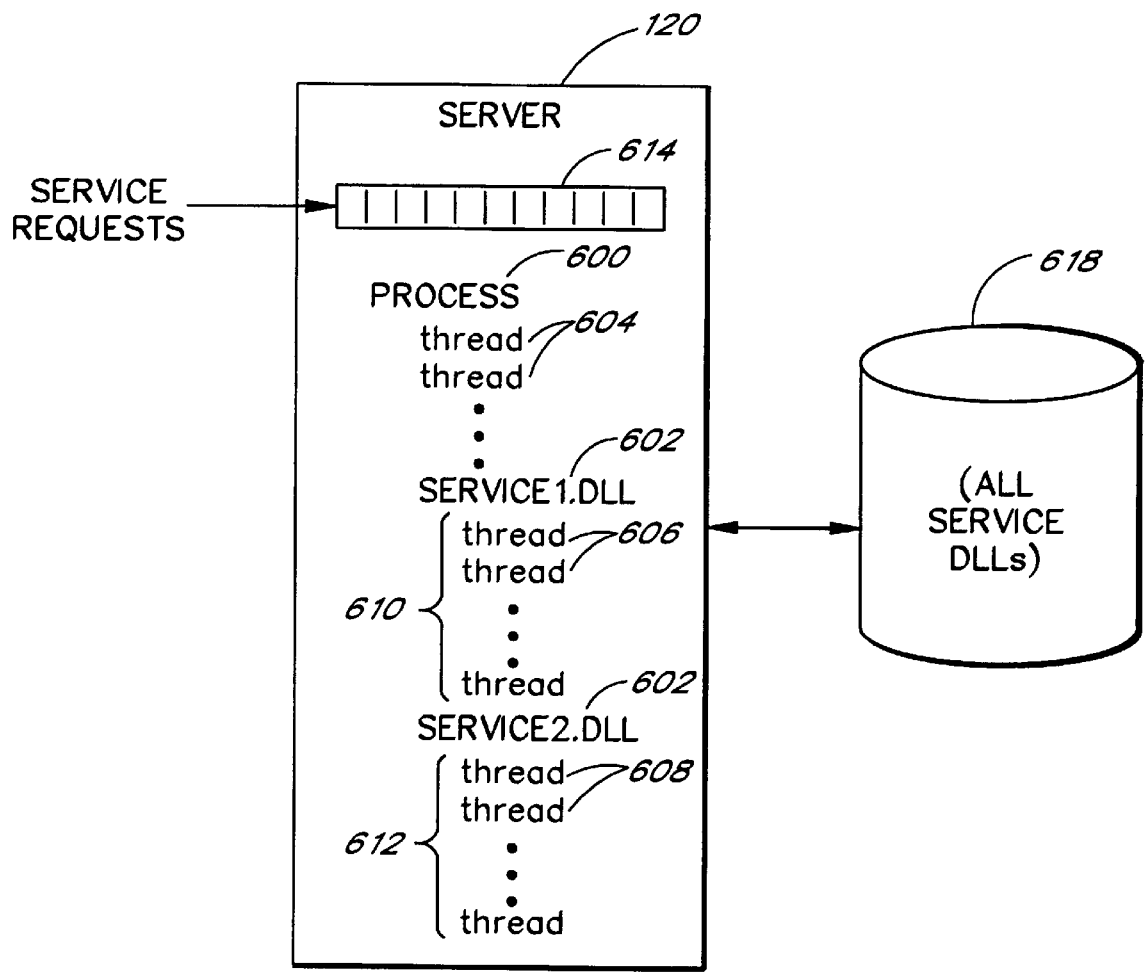
FIG. 6 illustrates a preferred software implementation of services on an application server.

FIG. 6 illustrates a preferred architecture for the servers 120 of the on-line services network 100. All service DLLs 602 (two shown for the server 120 in FIG. 6) run as part of a single, multi-threaded NT process 600. The two service DLLs 602 shown in FIG. 6 could be, for example, a CHAT.DLL and a BBS.DLL, which implement the server portions of the CHAT and BBS service applications respectively. One or more threads 604 are process-wide threads which perform functions that are not specific to any particular service, while other threads 606, 608 are dedicated to the particular services.

As is well known in the art, a thread is a schedulable entity of a process, and represents a sub-task of the process. During execution of a thread, the thread resides within the process's virtual address space. Advantageously, all of the threads of an NT process share the address space and the process's resources, including the process's access token, base priority, and object handles. A description of processes and threads under the Microsoft Windows NT operating system can be found in Helen Custer, *Inside Windows NT*, Microsoft Press, 1993.

In the preferred embodiment, a pool of threads is maintained for each server application running under the process 600, and threads are dispatched from the pool on a per-service-request basis. In the example shown in FIG. 6, a first pool 610 contains the threads 606 that are dedicated to SERVICE1.DLL, and a second pool 612 contains the threads that are dedicated to SERVICE2.DLL. Service requests (typically in the form of messages from client microcomputers 102) that are routed to the server 120 are placed in a service request queue 614, and are extracted from the queue 614 by the first available thread within the corresponding pool 610, 612. Although a single service request queue 614 is shown in FIG. 6, a separate queue may be allocated to each service DLL.

The use of a single multi-threaded process (as opposed to multiple processes) to handle multiple sessions of the same service is particularly advantageous for services that permit the interaction or exchange of information between users. Examples of such services are CHAT and multi-user interactive games. With CHAT, for example, a message typed in by one user will be displayed on the monitors of one or more other users who are participating in the CHAT conference. Prior art designs, which use a separate process for each user, require interprocess communications (often between large numbers of processes) to accomplish this exchange of information between users, requiring a high degree of operating system overhead. Such overhead is significantly reduced in the present design, since no special data passing mechanisms are required for passing data between threads; one user-specific thread simply writes its data to the shared memory, and other user-specific threads then read the data as input.

A further advantage of using a single multi-threaded process to handle multiple service sessions is the ability to have individual threads that handle operations that are common to all users. For example, a single thread 604 of the process 600 can be used to monitor user inactivity for all users of the server 120.

In accordance with another feature of the architecture, particular services can be automatically activated or deactivated on the server 120 (or any server of the system) by loading and unloading service DLLs dynamically (i.e., without stopping the process 600). In the preferred embodiment, the process 600 dynamically loads and unloads DLLs (in response to commands issued from a system console microcomputer over the LAN 122) using the LoadLibrary( ), GetProcAddress( ), and FreeLibrary( ) functions of Microsoft's Win32 API. The LoadLibrary( ) function is described at pages 86 and 87 of *Microsoft Win32Programmer's Reference Manual, Volume 4*, (Microsoft Press, 1993, ISBN 1-55615-518-2). The GetProcAddress( ) and FreeLibrary( ) functions are described at page 653, and at pages 484–485, respectively, of *Microsoft Win32Programmer's Reference Manual, Volume* 3, (Microsoft Press, 1993, ISBN 1-55615-517-4). Briefly, these functions do the following. The LoadLibrary( ) function maps a specified DLL module (or other executable module) into the address space of the calling process 600, and returns a handle to the module. The GetProcAddress( ) function uses the handle (returned by the LoadLibrary( ) function) and a DLL function name as input parameters, and returns the address of the specified DLL function. The FreeLibrary( ) unmaps a specified DLL module from the address space of the calling process 600.

By way of example, to add the CHAT service to the server 120 shown in FIG. 6, the DLL for the CHAT service (CHAT.DLL) would be loaded into RAM from the server's hard disk 618. The process 600 would then call the LoadLibrary( ) and GetProcAddress( ) functions to link to CHAT.DLL and implement the CHAT service. The process 600 may subsequently use the FreeLibrary( ) function to dynamically unload the DLL. In the preferred embodiment, all service DLLs for all on-line services are stored on the hard disks 618 of all servers 120 of the system, so that any service can be automatically activated on any server 120 at any time.

6. Arbiter Overview

As described above, the various on-line services of the network 100 provide user access to service-specific data. Such service-specific data is referred to herein as "service content data" (or merely "content data"). Examples of service content data include posted BBS messages, file attachments to BBS messages, news articles, stock quotes, graphics images, sound files, download-and-run files, and the like.

In the preferred embodiment, certain on-line services maintain replicated copies of some or all of their service content data on each server 120 of the relevant service group. This approach improves service performance by eliminating the need for the servers 120 to access a shared database. For the BBS service, for example, duplicate copies of all message postings are preferably stored locally on each BBS server 120, and when a user requests read-only access to a posting, the BBS server 120 assigned to the user's service session accesses its own local copy of the message.

The Arbiter is a background replication service which is used by other services on the network 100 (such as the BBS service) to support the replication of service content data across multiple servers 120. The Arbiter is a "generic" replication service, meaning generally that different services can use the Arbiter's replication services for different, service-definable purposes. The BBS service, for example, preferably uses the Arbiter to replicate message postings, so that all servers 120 in the BBS service group contain like message data, and so that all users of the BBS service see the same message postings. Advantageously, the Arbiter software is service-application-independent, and thus does not have to be customized for each service. Service applications that use the Arbiter are simply written to make use of the generic services provided by the Arbiter using the Arbiter's application program interface (API).

In the preferred embodiment, each service (or service group) that uses the Arbiter (referred to herein as an "Arbitered" service or service groups) has one dedicated Arbiter microcomputer 128 assigned to it. With reference to FIG. 3, for example, a BBS Arbiter microcomputer 128 may be dedicated to the BBS service group 304. Each dedicated Arbiter microcomputer 128 (such as the BBS Arbiter microcomputer 128) runs the same Arbiter software, but performs replication services for only one service (or service group). For example, the BBS Arbiter microcomputer 128 (FIG. 3) implements the Arbiter service, but provides replication services only for the BBS service group 304. In other embodiments, Arbiter microcomputers 128 may be shared among different service groups. In yet other embodiments, the Arbiter may be configured to run on one of the servers 120 of the service group.

The implementation of each service's "replication logic" as a separate service running on a separate microcomputer has a number of advantages over prior art replication techniques, which are primarily distributed in nature. For example, since most of the replication logic is implemented on the Arbiter microcomputer 128, rather than on the servers 120, the servers 120 can spend more time servicing client requests, and less time running complex replication protocols. Additionally, as described below under the heading ARBITER FAILURE, end users are essentially shielded from failures in the replication logic, since the replication logic is implemented primarily by a separate, background service (rather than the on-line services themselves), which is not visible to end users. Further, in the event that a server 120 fails or otherwise requires maintenance, the server's content can automatically be brought up-to-date when the server is brought back on-line. These and other advantages of the present invention will be apparent from the description that follows.

Depending upon the context in which it is used hereinafter, the term "Arbiter" will refer either to the Arbiter service as a whole, or to the Arbiter software (i.e., the Arbiter service application) running on a particular computer. The term "Arbiter service" will also be used to refer to the service as a whole. The term "Arbiter microcomputer," as used herein, refers to a microcomputer that runs Arbiter software to implement the Arbiter service.

In the preferred embodiment, the Arbiter replicates service content data by dispatching atomic transactions (which are generated by the Arbitered services) to groups servers 120. These transactions are in the form of update commands (referred to herein as "update transactions") which, when interpreted by the receiving service applications, typically specify an update to a specific data entity or set of data entities. Each server 120 which receives the update transaction from the Arbiter processes the transaction, which normally involves updating the server's locally-stored service content data. With reference to FIG. 3, for example, to replicate a message posting across all of the servers 120*e–g* of the BBS service group 304, the BBS Arbiter microcomputer 128 would send an update transaction to each of the servers 120*e–g*, specifying to the BBS service the data entity (such a file) to be created or otherwise updated. As further described below, however, service applications can be written to use the Arbiter's generic transaction replication services for purposes other than updating service content data. For example, the Arbiter could be used as a message broadcast service.

The Arbiter supports content replication by performing the following primary functions, each of which is described in greater detail in the sections that follow:

Transaction replication. Services send update transactions to the Arbiter (as described above), and the Arbiter issues the update transactions (in a serialized form) to all servers 120 within the relevant service group to replicate the transaction. Each service "decides," based on its own service-specific criteria, when to send an update transaction to the Arbiter. For example, the BBS service sends an update transaction to the Arbiter (or more specifically, to the BBS Arbiter microcomputer 128) whenever an end user submits a request to post a BBS message. The APIs used to replicate transactions are described below under the heading ARBITER INTERFACE.

Transaction monitoring. Whenever the Arbiter replicates a transaction, the Arbiter monitors the outcome of the transaction on each server 120 of the service group to ensure consistent processing of the transaction by all such servers. When one or more servers 120 indicates a different outcome than the other servers of the service group, the Arbiter uses a voting scheme to resolve the conflict between the servers. A preferred voting scheme is described below under the heading STATUS CODES AND CONFLICT RESOLUTION.

Control of states of servers. The Arbiter controls the states of servers by controlling the states of the service applications running on the servers. For example, an Arbiter microcomputer 128 can take one of the servers 120 within its service group off-line if it is in conflict with the other servers of the service group. The various possible states of the servers 120 are described below under the heading SERVER STATES.

Generation of transaction log. Each Arbiter microcomputer 128 maintains a log for its respective service group of the transactions that have been submitted by the service for replication. The service-specific transaction logs contain sufficient information to permit the previously-replicated transactions to later be submitted to a server that is being brought up in the service group. The preferred implementation of the transaction log is described below under the heading TRANSACTION LOG.

Roll forward of servers. When a server 120 is added to a service group, the Arbiter can be used to "roll forward" or "synchronize" the new server with the existing servers of the service group. The process of rolling forward a server preferably involves issuing previously-replicated update transactions (which are stored in the service group's transaction log) to the new server. Once a new server 120 has been rolled forward, the content data of the new server will normally be identical to the content data of each existing server within the service group. This feature of the Arbiter is described below under the headings ARBITER STRUCTURE and SERVER STARTUP.

As indicated above, the transaction replication services of the Arbiter are generic, and can be used for different purposes by different services. As further described below under the heading TRANSACTIONS AND TRANSACTION TYPES, services which use the Arbiter are preferably transaction-based services which use atomic transactions to specify operations to be performed by servers.

In the currently preferred embodiment, the services that make use of the Arbiter are the DIRECTORY SERVICE, the MEDIAVIEW service, and the BBS service. The following is a brief description of each of these services, and the purposes for which these services use the Arbiter.

DIRECTORY SERVICE. The DIRECTORY SERVICE provides to end users an iconic, hierarchical view of the various entities (such as on-line services and service content files) that are available on the network 100, and, based on membership privileges, allows end users to perform authorized actions (e.g., run, view, access, subscribe) with respect to such entities. The various entities form nodes of a hierarchical, tree-like directory structure. The DIRECTORY SERVICE uses the Arbiter to replicate all modifications to the structure, including the creation of new nodes, the linking and unlinking of nodes, the changing of node properties (name, access rights, etc.), and the addition and deletion of icons, metafiles, sound files, and download-and-run files.

MEDIAVIEW. The MEDIAVIEW service allows users to view multimedia titles. This service uses the Arbiter to add, delete and modify MEDIAVIEW titles, such as an "MSN Today" window which is changed on a daily basis.

BBS. Through the posting and viewing of messages on predetermined topics, the BBS service allows end users to ask and answer questions, find information, and hold non-realtime conversations with other users interested in the same topics. In the preferred embodiment, the BBS service is also used to provide access to the Internet. The BBS service uses the Arbiter to replicate its content data by replicating message postings (including message postings from the Internet). The BBS service also uses the Arbiter to trim the BBS content data (using message expiration dates).

Services which do not make use of the Arbiter include CHAT, REAL-TIME GAMES and MAIL. The CHAT service does not use the Arbiter because each interactive CHAT conference is preferably handled by a single server 120 (since the number of users per CHAT conference is normally small enough to be handled by one server). Similarly, the REAL-TIME GAMES service does not use the Arbiter because each game is preferably handled by a single server 120. The MAIL service does not use the Arbiter because, as described above, the MAIL service forwards email messages to the MAIL server of the target user (rather than replicating email messages).

In addition to the service-specific uses for the Arbiter described above, the Arbiter is used to facilitate the backup of service content data. Content backup is preferably accomplished as follows. Each service group has a backup server which runs the service application (or service applications), but which does not accept requests from clients. This backup server receives and processes all transactions that are replicated by the service group's Arbiter microcomputer 128. The backup server thus maintains the same content data as the other servers 120 in the service group. Periodically, the service application on the backup server 120 is stopped, and the service content data on the backup server is backed up on tape. When the service application on the backup server is restarted, the Arbiter rolls forward the backup server (by submitting to the backup server the update transactions that it missed while off-line) to bring the backup server's content data up-to-date. The backup server is a special type of server 120 referred to herein as an "auditor." Auditors are further described below under the heading AUDITORS.

It is also contemplated that service applications will be written to use the Arbiter's transaction replication services to perform interprocess communications. For example, a service application could use the Arbiter to broadcast certain types of information (such as client-count data, service load data, statistical data, etc.) to the other servers of the service group. The information to be passed to the other servers 120 would simply be packaged (or otherwise specified) within a transaction by the originating server, and the transaction would then be forwarded to the service group's Arbiter for replication.

The general process by which the Arbiter service performs transaction replication will now be described. The details of this process, such as the specific methods and application program interfaces (APIs) used, will be described in the sections that follow.

Whenever a server 120 of an Arbitered service group receives a request (typically from a client microcomputer 102) that requires an update to the service's replicated content data, the server generates and sends an update transaction to the service group's Arbiter microcomputer 128 without processing the transaction. This transaction specifies, in a generic form, the specific content data (such as a BBS file) to be replicated. The format (e.g., text, graphics, etc.), purpose and meaning of this data are irrelevant to the Arbiter.

The Arbiter microcomputer 128 records each update transaction it receives in its transaction log, and dispatches each update transaction to every server 120 in the service group (by issuing remote procedure calls to the servers 120), including the server 120 that generated the transaction. (Each Arbiter microcomputer 128 keeps track of the servers 120 within its respective service group by monitoring the global registry 145, which includes a mapping of servers to service groups).

The servers 120 that receive the update transaction from the Arbiter respond by processing the update transaction, and by returning a status code that indicates the success or failure of the transaction. Thus, unlike the two-phase commit protocol, the servers 120 perform the update transaction "immediately," rather than returning a message indicating whether the update transaction can be performed and then waiting for subsequent instruction on how to proceed. Updates are thus performed more rapidly than would be possible with the two-phase commit protocol, and are performed with significantly reduced message traffic over the LAN 122.

The update transactions are dispatched to the servers 120 in a serialized order (preferably on a first-submittedfirst-dispatched basis), so that all servers of the service group process the update transactions in the same order. This ensures consistency between the replicated copies of the service content data.

Each time an update transaction is dispatched by the Arbiter, the Arbiter monitors the outcome ("success" or "failure") of the transaction on each server 120 by checking the status codes returned by the servers 120. When one server 120 of the service group processes the dispatched transaction differently than the other servers, the Arbiter uses a voting scheme to decide which server or servers are to be taken off-line within the service group. In the general case, the Arbiter uses a "majority rules" voting scheme. Under the majority rules scheme, if a minority number of servers 120 of the service group report a different outcome than the other servers, the minority servers are treated as being "inconsistent" with the final outcome, and are taken off-line. The Arbiter service thereby ensures that all operational servers 120 within the service group contain consistent service content data.

By way of example, suppose that the BBS server 120*f* (FIG. 3) receives a user service request that will cause a BBS message to be added to a specified folder, and that the BBS server 120*g* receives a service request that will cause another BBS folder to be deleted. Since both of these requests require updates to BBS content data, the servers 120*f* and 120*g* send update transactions to the BBS Arbiter microcomputer 128 (without updating their own copies of the BBS content data). (Note that it is the responsibility of the service applications to detect and forward update transactions.) The BBS Arbiter microcomputer 128 (hereinafter "BBS Arbiter 128") records these transactions in its transaction log 306. One or more dispatcher threads (not shown) running on the BBS Arbiter 128 read the update transactions from the transaction log 306, and dispatch the update transactions (in the order received) to each of the BBS servers 120*e*–*g*.

Upon processing each update transaction, the servers 120*e*–120*g* report back to the BBS Arbiter 128 on the success or failure of the transaction by returning a status code (with status codes returned in the same RPC sent by the BBS Arbiter to perform the transaction). To provide a specific example, if the servers 120*e* and 120*f* report successful completion of the update transaction and the server 120*g* reports a failure, the "odd-ball" server 120*g* is taken off-line by the BBS Arbiter 128 (by placing the server's BBS.DLL in a "stopped" state). If, on the other hand, the servers 120*e* and 120*f* report a failure of the transaction and the server 120*g* reports a success, the server 120*g* is again taken off-line (since it represents the minority outcome), even though the server 120*g* reported a successful completion of the transaction. Whenever a server 120 is taken off-line, a message is sent to a system console (not shown) to inform a human operator of the problem.

While the above example illustrates the "majority rules" voting scheme which is used in the general case of a server conflict, the Arbiter uses a different rule when the first status code returned by any server 120 in the service group indicates a "success." In this event, the Arbiter deems the "final status" of the transaction to be a success, and takes any servers which return an error code off-line. This advantageously allows the Arbiter to rapidly determine the final status of most transactions, and allows the Arbiter to issue the next update transaction in its queue before receiving all of status code for the current transaction. (As described below, the Arbiter does not issue the next update transaction in its queue until the final status of the most recently issued update transaction is determined.) The status codes and method for resolving conflicts are described in detail below under the heading STATUS CODES AND CONFLICT RESOLUTION.

For each update transaction, the Arbiter microcomputer 128 records in the transaction log the following information: the time of the transaction, a transaction ID (transaction IDs are 32 bit numbers assigned to update transactions by the Arbiter in sequential order), the service group ID, the data replicated by the transaction, the completion status of the transaction ("pending" or "completed"), and the final status of the transaction ("success," "Arbiter-defined failure," or "service-defined failure") following the resolution of any conflicts. Each service-specific transaction log is stored on the hard disk of the corresponding Arbiter microcomputer 128, and continues to grow in size until trimmed. Transaction logs are trimmed according to trimming policies which are specified in the global registry 145. The disk structures included within the transaction logs, and the trimming policies used for trimming the transaction logs, are described below under the heading TRANSACTION LOG.

7. Auditors

An auditor is a special type of server 120 which may optionally be included within a service group that uses the Arbiter. An auditor "listens" to its service group's transaction traffic, but does not handle user service sessions, and does not participate in conflict resolution. Auditors are used in the host data center 104 for various purposes, such as: (1)

to back up service content data (as described above), (2) to forward update transactions to remote data centers, (3) to perform administrative and maintenance functions (such as the deletion of old BBS messages), and (4) to keep an audit trail of service group activity.

Although the configuration of an auditor may vary according to its specific purpose, all auditors will normally function according to the following rules:

1. Auditors receive update transactions only after the final status of the transaction is known (i.e., after, based on the status codes returned by the "normal" servers 120, the Arbiter resolves any conflicts and flags the transaction as either a "success" or a "failure").
2. The auditor receives all transactions stored within the service group's transaction log, regardless of final status. (Normal servers do not receive transactions for which the status is known to be a failure).
3. Auditors have no vote in conflict resolution (as implied by rule 1).

One example of an auditor is the above-described backup server 120, which is configured to maintain the service content data of its respective service group but which does not accept client connections.

Another example of an auditor is a BBS Internet feed server 120, which is used in the host data center 104 to provide end users with limited Internet access. In the preferred embodiment, the BBS Internet feed server 120 reads Internet newsgroup messages and post these messages (by submitting update transactions to the Arbiter) within its BBS service group, thereby providing users with access to such newsgroup messages.

The BBS Internet feed server 120 is also used to post messages to the Internet. To identify BBS messages (posted by end users) that are to be posted to the Internet, the BBS Internet feed server 120 monitors the content of transactions posted by the BBS Arbiter. Messages which contain a group identifier that corresponds to an Internet group are routed to the Internet.

Each server 120 in the host data center 104 has an auditor flag associated with it, which indicates whether or not the server is configured as an auditor. The auditor flags are stored in the global registry 145, and are used by the Arbiter to identify the auditors.

8. Server States

Each Arbiter microcomputer 128 controls the states of the servers 120 within its respective service group by issuing RPCs (remote procedure calls) to the servers over the LAN 122. For example, the BBS Arbiter 128 (FIG. 3) controls the states of servers 120*e–g* (as long as these servers remain allocated to the BBS service group 304), and will control any additional servers which may be subsequently assigned to the BBS service group. (As further described below under the heading ARBITER STRUCTURE, the Arbiters periodically access the global registry 145 to determine the identities of the servers 120 that are currently assigned to their respective service groups).

The possible server states are as follows:

Invalid—service currently not available on server.

Launched—service (i.e., server portion of service application) has been initialized on server.

Synchronizing—server is being brought up-to-date (i.e., rolled forward) by Arbiter.

Active—service is up and running on server, but is not accepting service requests from clients.

Active and accepting—service is up and running on server, and is accepting client service requests. (Auditors normally are not placed in this state).

Stopped—service application has been stopped on server.

As will be apparent from the forgoing, the above-listed server states are actually states of specific service applications running on the servers. For example, the "state" of the BBS server 120*g* (FIG. 3) refers to the state of the server portion of the BBS service application on the server 120*g*, which is implemented as a dynamic link library. Server states are thus service-specific, and a given server 120 can have multiple states (one for each service group). For example, the MAIL/BBS server 120*e* (FIG. 3) will have two states—one for the MAIL service, and one for the BBS service. Thus, in referring herein to a "state" of a server, it should be understood that this state is with respect to a specific service.

As shown in FIG. 4 and described above under the heading SERVICE MAP, the service map 136 indicates the states of the servers 120 within the host data center 104. The state information within the service map 136 is used by the Gateways 126 to identify the servers 120 which are in the "active and accepting" state (and thus capable of processing client service requests), and is used by the Arbiters to monitor the states of the servers 120 within their respective service groups.

The process by which the Arbiter brings up a newly-added server within a service group is described below under the heading SERVER STARTUP.

9. Arbiter Structure

Figure 7:
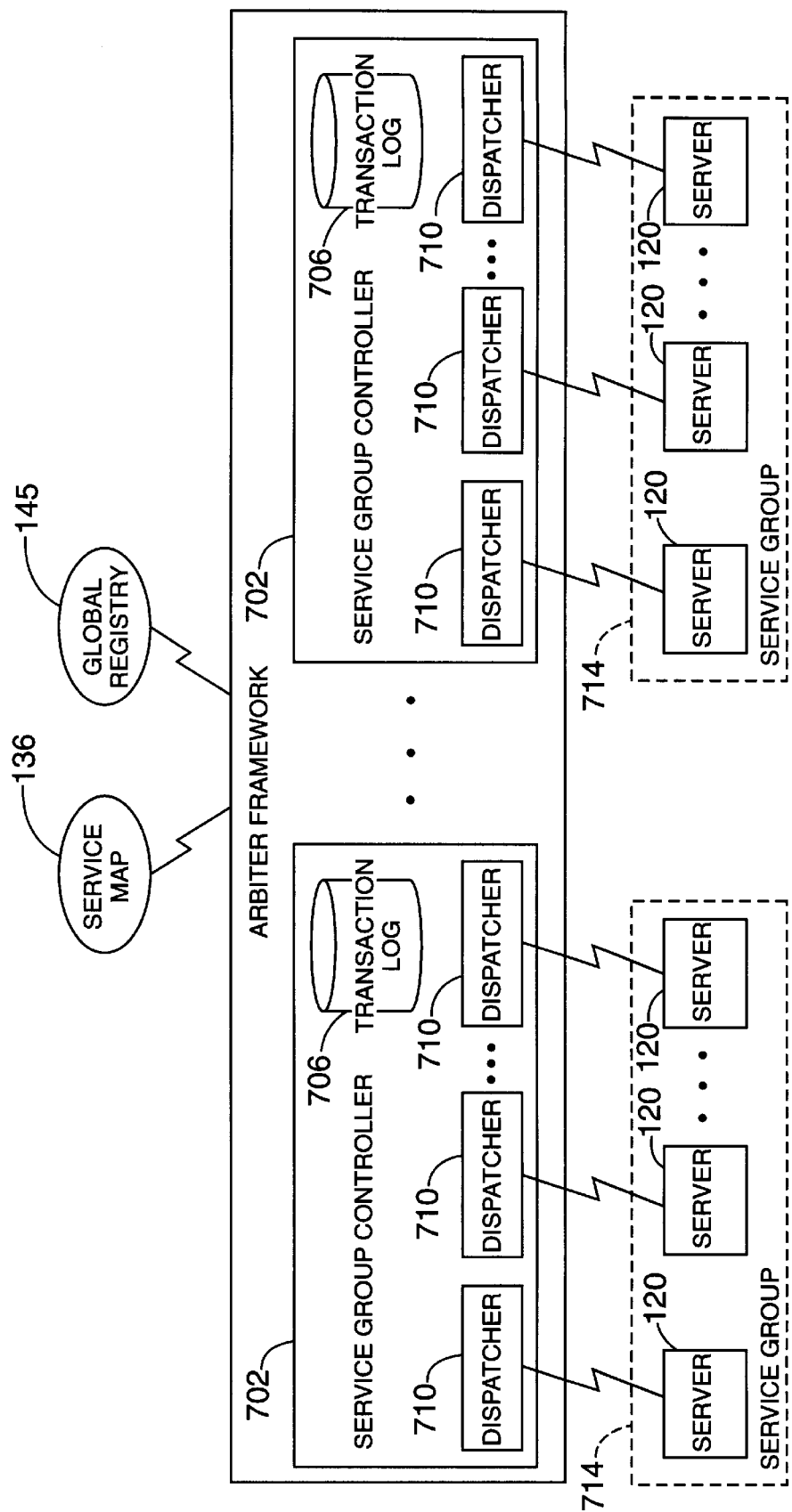
FIG. 7 illustrates a preferred structure of the Arbiter service within the on-line services network of FIG. 1.

FIG. 7 illustrates the general structure of the Arbiter service within the framework of the on-line services network. The Arbiter comprises multiple service group controllers 702. Each service group controller 702 is an independent entity which controls a single service group. In the preferred embodiment, each service group controller 702 is implemented on a respective Arbiter microcomputer 128.

Each service group controller 702 maintains a transaction log 706 for its respective service group 714. Each transaction log 706 contains information about the update transactions that have been submitted to the Arbiter (by the respective services) for replication. As described above, the transaction logs 706 are preferably stored on the hard disks of the respective Arbiter microcomputers 128.

With further reference to FIG. 7, each service group controller 702 contains one dispatcher 710 for each member (i.e. server 120) of the service group 714. Thus, for example, a service group 714 with ten servers 120 will have ten dispatchers 710, one per server. Each dispatcher 710 is preferably in the form of a dispatcher thread which runs in a continuous loop. The dispatcher threads dispatch update transactions to their respective servers 120, and monitor the outcomes of these transactions on the servers 120.

The basic implementation of each dispatcher 710 is illustrated in FIG. 8. As indicated by reference number 802, when a server 120 is initially added to the service group, the dispatcher 710 introduces the Arbiter to the server (by informing the new server of the Arbiter microcomputer's IP address), and places the new server in the "synchronizing" state. The dispatcher 710 then attempts to synchronize the new server 120 with the other servers 120 of the service group 714. This involves (1) reading the new server's "checkpoint," which is the transaction ID of the last transaction (if any) processed by the new server 120, and (2) determining whether or not the service group controller's transaction log 706 goes back far enough to bring the new server 120 up-to-date.

If the checkpoint is not found within the transaction log 706, a ShutDownServer method is called. The ShutDownServer method informs a system operator of the Arbiter's inability to roll forward the server 120. A tape backup of the transaction log 706 may then be used (in combination with the up-to-date transaction log) to roll forward the server 120.

As indicated by reference number 804, once it has been verified that the transaction log 706 can be used to roll forward the new server, the dispatcher 710 enters into a continuous loop, which continues until either the service application on the server 120 is shut down, or the service's is shut down. Within this loop, the dispatcher 710 does the following: (1) reads update transactions from the transaction log 706 and submits these update transactions to the new server 120 (in sequential order) for processing, (2) monitors the status of submitted transactions for conflicts, (3) updates the server's checkpoint value, and (4) when an unresolvable conflict occurs, shuts down the server 120. Once the new server 120 has been rolled forward, it is placed in its normal state (which, unless the server 120 is an auditor server, is normally the "active and accepting" state). The processes of monitoring transaction results and resolving conflicts are described below under the heading STATUS CODES AND CONFLICT RESOLUTION. The process of bringing up a new server is further described under the heading SERVER STARTUP.

With further reference to FIG. 7, the Arbiter accesses the service map 136 and the global registry 145 to obtain up-to-date information about servers 120 and services that are controlled by the Arbiter. As indicated above, the global registry 145 contains a service group description for each service group within the host data center 104. Each service group description includes the following information:

(1) A service group ID.

(2) The ID of the Arbiter microcomputer 128 (if any) in charge of the service group 714.

(3) The transaction log trim policy for the service.

(4) A description of each member (i.e., server 120) of the service group 714, including (a) the server ID, (b) the service name, (c) the version of the service application, and (d) an auditor flag.

In addition to the dispatcher threads, the Arbiter contains the following threads:

Trim thread. This is a low-priority thread in charge of trimming the transaction log 706 according to a trim policy. Trim policies may vary from service to service.

The trim policies for the Arbiter-supported services are specified in the global registry 145.

Registry thread. This is a low-priority thread which runs at configurable intervals (with a default of every 30 seconds) and reads the service group information from the global registry 145 to look for changes in the service group configuration (such as the addition or deletion of servers to/from the service group 714, or a change to a service group trim policy. The various operations performed by the registry thread in response to changes in service group descriptions are described below.) This thread also looks for "hung" or "frozen" dispatcher threads. (A dispatcher thread is considered hung if there have been no signs of thread activity for a predetermined period of time). A hung thread may reveal problems in its associated service, or other problems in the network 100. If a hung thread is detected, a message is displayed on a data center console to inform a human operator of the problem.

Although the Arbiter is shown in FIG. 7 as being a single entity within the host data center 104 (and could be implemented as a single entity), as described above, the Arbiter software (referred to herein as the "Arbiter service application") is preferably replicated across multiple, service-group-specific Arbiter microcomputers 128. Thus, each Arbiter microcomputer 128 independently runs its own trim thread and registry thread.

Based on the information stored within the global registry, each registry thread does the following:

(1) Creates new service group controllers. If the global registry 145 indicates that this Arbiter (i.e., this service-specific instance of the Arbiter service application) is in charge of a service group 714 but no service group controller 702 currently exists, a new service group controller is created.

(2) Deletes obsolete service group controllers. If the global registry 145 no longer indicates that this Arbiter is in charge of a service group 714 for which a service group controller 702 currently exists, the service group controller is removed.

(3) Controls updates to service group controllers. The registry thread instructs the service group controller 702 to update itself with the service group information that is specific to its service group 714. The service group controller 702 then does one of the following:

(3a) Creates new dispatchers. If the global registry 145 indicates that a server 120 exists (within the service group controller's service group 714) for which no corresponding dispatcher 710 exists, a dispatcher thread is started.

(3b) Deletes obsolete dispatchers. If the global registry 145 no longer indicates that there is a server 120 within the associated service group 714, but a dispatcher 710 still exists for the server, the dispatcher 710 is removed.

(3c) Updates dispatchers. The dispatchers 710 are updated with information about their respective servers 120, such as the states of the server auditor flags.

(3d) Updates service group information. The information about the service group 714 (such as the trim policy) associated with this service group controller 702 is updated.

10. Transactions and Transaction Types

In the preferred embodiment, the services which use the Arbiter use atomic transactions (which specify atomic server operations) to specify updates to service content data. As is known in the art of distributed database systems, an operation is "atomic" if it is considered (or guaranteed) to be functionally indivisible. A service application can guarantee the atomicity of a transaction either by processing the transaction without interruption (to avoid interference with other transactions), or by providing a rollback (backup and restore) mechanism for restoring the system to the state it was in immediately prior to the processing of the transaction.

Update transactions which are passed to the Arbiter by the servers 120 typically originate from client transactions (i.e., client service requests) that are passed to the servers 120 by client applications. The service applications running on the servers 120 simply monitor the incoming client transactions, and, based on service-specific criteria, decide whether or not any client transactions require an update transaction to be sent to the Arbiter.

When a client transaction causes a service to send an update transaction to the Arbiter, the client transaction may differ from the update transaction. For example, an update transaction may be generated (by an Arbitered service) from a portion of a client transaction, or from multiple client transactions. Alternatively, a single client transaction may spawn multiple update transactions. Accordingly, the update transactions submitted to the Arbiter (which may also appropriately be referred to as "Arbiter transactions") by the servers/services should be distinguished from the client transactions from which they may be derived.

As noted above, it is the responsibility of the service applications running on the servers 120 to generate update transactions (or "Arbiter transactions") from client requests. Because the information contained within these update transactions is meaningless to the Arbiter, the Arbitered servers/services can include any type of service-specific information (e.g., service commands, method parameters, method data, etc.) within the update transactions. Thus, each Arbitered service can essentially have its own "transaction language", or "transaction format" for passing information between servers 120 via update transactions.

It should be recognized that update transactions submitted to the Arbiter need not originate from client applications running on a client microcomputers 102. For example, when the Arbiter is used to perform interprocess communication between servers, the update transactions will typically originate from the applications running on the servers 120. Further, transactions may originate from a system console that is connected to the LAN 122 (when, for example, a system operator creates a new BBS folder), or may originate from the Internet.

Because the following description will focus primarily on the update transactions that are submitted by the servers 120 to the Arbiter (as opposed to client transactions submitted to the servers by client applications), the term "transaction," unless indicated otherwise, will hereinafter refer to an "update" or "Arbiter" transaction.

Although various transaction methods are possible, the preferred implementation of the Arbiter service supports three specific types of transactions. The first type is a "replicate buffer" transaction, in which a service uses the Arbiter to replicate data stored within a memory buffer. The second type is a "replicate file" transaction, in which the service uses the Arbiter to replicate a specified file, and optionally specifies a buffer to be replicate along with the file. The third type is a "replicate directory" transaction, in which a service uses the Arbiter to replicate information contained within a specified filesystem directory, and optionally specifies a buffer to be replicate along with the directory. The replicate buffer, replicate file, and replicate directory transactions are implemented, respectively, by the methods FReplicateBuffer, FReplicateFile and FReplicateDir. These Arbiter API's are described below under the heading ARBITER INTERFACE.

As indicated above, the Arbiter advantageously replicates transactions without regard to either the transaction content or the purpose of the transaction. For example, when the Arbiter receives a "replicate file" transaction, the Arbiter simply replicates the specified file without evaluating either the file type or the data contained within the file. Authors of service applications can thus use the Arbiter's transaction replication services for virtually any purpose that requires the passage of information from one server 120 to other servers of the same service group. For example, a service application can be written to use the Arbiter to pass data or commands that are meaningful only to the service application.

11. Arbiter Interface

FIG. 9 is a listing of the main methods used by Arbitered services to interface with the Arbiter. These methods form the Arbiter API. The first set of methods in FIG. 9 is used by the services for making calls to the Arbiter. A given service on the network 100 (which may be either an on-line service or a background service) may implement all of these methods, some of these methods, or none of these methods. The second set of methods in FIG. 9 is used by the Arbiter to dispatch transactions to the servers 120 for processing.

The methods used by Arbitered services to initiate transaction replication are FReplicateBuffer, FReplicateFile and FReplicateDir. The following is a description of these three methods.

FReplicateBuffer. A server 120 (i.e., a service application running on a server 120) calls this method to replicate information contained within a memory buffer. The buffer is replicated via an RPC. The calling server 120 gets back the transaction ID (TRID) assigned by the Arbiter to this transaction. The Arbiter replicates the transaction by calling the DoTransactionBuffer method for each server 120 (including the calling server) within the service group, which causes each such server to process the transaction.

FReplicateFile. A server 120 calls this method to replicate information contained in a file. The server may optionally specify a buffer (as with the FReplicateBuffer method) to be replicated along with the file. The szpath parameter (FIG. 9) specifies the path of the file to be replicated. This path must be readable by the Arbiter. (Typically, the servers within a service group create a "sharepoint" directory, where they place the files being replicated). The file is copied to the transaction log 706 of the Arbiter microcomputer 128 (and placed under a TRAN_DAT subdirectory, as described below under the heading TRANSACTION LOG). Once this method returns (which is normally prior to the actual replication of the file), the caller is free to modify or delete the file. As with FReplicateBuffer, the memory buffer (if provided) is replicated via an RPC. The calling server 120 gets back the TRID for the transaction. The Arbiter replicates the file by calling the DoTransactionFile method for each server 120 in the service group.

FReplicateDir. A server 120 calls this method to replicate information contained within a filesystem directory. The server may optionally specify a buffer to be replicated along with the directory. The szPath parameter specifies the path of the directory to be replicated. This path must be readable by the Arbiter. The specified directory and all of its subdirectories are copied to the Arbiter microcomputer 128 (and placed under a TRAN_DAT subdirectory, as described below under the heading TRANSACTION LOG). As with FReplicateBuffer, the memory buffer (if provided) is replicated via an RPC. The Arbiter replicates the specified directory by calling the DoTransactionDir method for each server 120 in the service group.

The provision for an optional buffer in the FReplicateFile and FReplicateDir methods is useful when a relatively small amount of data (such as a message) is to be replicated along with the file or directory. For example, when a BBS user posts a 100 byte message which has a file attachment, the BBS service can simply call FReplicateFile to replicate both the attached file and the message, with the message being provided as a 100 byte buffer.

All FReplicateBuffer, FReplicateFile and FReplicateDir calls are asynchronous; when one of these methods returns, the Arbiter is simply acknowledging that the transaction will be replicated sometime in the future.

The remaining methods of the Arbiter API are FStatus, FServerState, and FIncrement. The following is a description of these methods.

FStatus. A server 120 calls this method to determine the status of a transaction that has been submitted to the Arbiter. The caller provides the TRID (transaction ID) of the transaction, and the Arbiter returns a flag indicating whether the transaction has been completed (i.e., replicated), or is still pending. If the transaction has been completed, the Arbiter also returns a "final status" code. The final status code is either 0 (indicating a success), or an error code. Certain error codes are reserved for definition by the services which use the Arbiter. The status codes are described below under the heading STATUS CODES AND CONFLICT RESOLUTION.

FServerState. A server 120 can obtain its own state (with respect to a given service group) by calling this method. The Arbiter responds by returning the state (for example, "synchronizing" or "active") of the calling server. If the state is synchronizing, the Arbiter also returns a "percent completed" value, indicating how far along the server is in the synchronization (i.e., roll forward) process.

FIncrement. Services call this method to obtain globally unique IDs (in the form of 8 byte integers). The DIRECTORY SERVICE calls this method, for example, to assign unique IDs to folders and icons. The calling server/service specifies the "kind" of ID it wants by specifying an index within the Arbiter's unique ID list. (The IDs assigned by this method are unique with respect to other IDs of the same kind, but not with respect to IDs of a different kind.) The calling service also specifies the number of IDs it wants. The method assigns unique IDs in sequential order, and returns only the first sequential ID of the sequence. For example, if a service requests 5 unique IDs and FIncrement returns the ID 70, the calling service has been assigned IDs 70, 71, 72, 73 and 74. It will be recognized that the FIncrement method is not essential to transaction replication, and is provided to services primarily for convenience. It will further be recognized that the FIncrement method could be implemented by some entity other than the Arbiter.

12. Status Codes and Conflict Resolution

After a transaction is submitted by the Arbiter to the servers 120 of a service group for processing (using DoTransactionBuffer, DoTransactionFile, or DoTransactionDir), each server returns a four byte status code indicating the outcome of the transaction. The following status codes are defined by the Arbiter:

TRANSACTION_STATUS_SUCCESS (00000000H). This is the only status code recognized by the Arbiter as indicating successful completion of a transaction. All other status codes are viewed as error codes.

TRANSACTION_STATUS_REPEAT (FFFFFFFDH). A server 120 may return this code if it is unable to process a transaction due to a lack of resources which may become available in the future. Upon return, the Arbiter will re-send the same transaction to the server 120.

TRANSACTION_STATUS_NOT_PROCESSED (FFFFFFFEH). A server 120 may return this code if it is unable to process a transaction and wishes to be taken off-line. Upon return, the Arbiter will take the server off-line within the service group by placing the server in the "stopped" state.

TRANSACTION_STATUS_ERROR (FFFFFFFFH). This is a generic error code which may be returned by the servers 120.

Codes between 00000001 and 0FFFFFFF (hex) are reserved for definition by the services that use the Arbiter. Different services may use these codes for different purposes.

When a transaction is submitted to the servers 120 of a service group, there is a possibility that not all of the servers will return the same status code. In this event, the Arbiter does not attempt to manipulate service content data to make the servers consistent. Rather, the Arbiter resolves the conflict by deciding which servers are to be deemed "consistent" (and kept running), and which are to be deemed "inconsistent" (and stopped). (Of course, if an "inconsistent" server operates in multiple service groups, only the service application that is in conflict needs to be stopped, and not the other service applications running on the server.) Whenever the Arbiter places a server 120 in the "stopped" state, a human operator is informed of the event.

A transaction is deemed by the Arbiter to be "pending" from the time it is initially submitted to the Arbiter until the time the "final status" of the transaction can be determined for the service group as a whole. The final status may be determined before all of the servers 120 have returned their status codes. Once the final status can be determined by the Arbiter, the Arbiter flags the transaction as being "completed." The completion status ("pending" or "completed") and the final status ("success," "error," etc.) are recorded in the associated transaction log 706 of the service group 714, as further described below under the heading TRANSACTION LOG. Until the Arbiter flags the current transaction as "completed," the Arbiter will not submit the next transaction.

In the preferred embodiment, the Arbiter uses the following procedure to determine the final status of each transaction, and to resolve any conflicts between servers.

Let S denote the set of servers in a service group which are not auditors.

Let $s_0, s_1, \ldots s_n$ indicate the individual servers in S.

Let $rc_i$ be the status code returned from a DoTransaction call (i.e., DoTransactionBuffer, DoTransactionFile, or DoTransactionDir) to server $s_i$.

Let trans_status be the completion flag ("pending" of "completed") for the transaction.

Let fs be the final status of the transaction.

Whenever $s_i$ returns status rc from a call to a DoTransaction method, the Arbiter does the following:

1. If trans_status="completed" and $rc_i$=fs, server $s_i$ is deemed consistent and is kept running. (Note that if the transaction is still pending, fs will be undefined).

2. If trans_status="completed" and $rc_i \neq$ fs, server $s_i$ is deemed inconsistent and is stopped.

3. If trans_stat="pending" and $rc_i$=TRANSACTION_STATUS_SUCCESS, and this is the first status returned by ANY server in S, then fs is set to $rc_i$, trans_status is set to "completed," and $s_i$ is deemed consistent and is kept running.

4. If trans_stat="pending," then do the following:
   4.1 If n is odd, and at least (n/2)+1 servers have returned TRANSACTION_STATUS_SUCCESS, then the transaction is completed and fs is set to TRANSACTION_STATUS_SUCCESS. Servers that returned TRANSACTION_STATUS_SUCCESS are deemed consistent and are kept running. All other servers are stopped.

4.2 If n is odd, and at least (n/2)+1 servers have returned something other than TRANSACTION_STATUS_SUCCESS, then the transaction is completed and fs is set to either the status returned by those servers (if all servers returned the same code) or to TRANSACTION_STATUS_ERROR otherwise. Those servers are deemed consistent and are kept running. Servers that returned TRANSACTION_STATUS_SUCCESS are stopped.

4.3 If n is even, and at least n/2 servers have returned TRANSACTION_STATUS_SUCCESS, then the transaction is completed and fs is set to TRANSACTION_STATUS_SUCCESS. Servers that returned TRANSACTION_STATUS_SUCCESS are deemed consistent and are kept running. All other servers are stopped.

4.4 If n is even, and at least (n/2)+1 servers have returned something other than TRANSACTION_STATUS_SUCCESS, then the transaction is completed and fs is set to either the status returned by those servers (if all of them returned the same code) or to TRANSACTION_STATUS_ERROR otherwise. Those servers are deemed consistent and keep running. Servers that returned TRANSACTION_STATUS_SUCCESS are stopped.

The "voting" scheme implemented by this procedure is summarized above under the heading ARBITER OVERVIEW.

As indicated in step 3 of this procedure, if the first server 120 to return its status indicates a "success," the Arbiter immediately deems the transaction as being a success, and flags the transaction as being "completed." This advantageously allows the Arbiter to rapidly issue the next transaction for replication, rather than having to wait for at least half of the servers to return their respective status codes. The risk of including this step is that, on very rare occasions, one server 120 may bring down all other servers in the service group by erroneously reporting the successful completion of a transaction.

The performance benefit achieved by allowing the next update transaction to proceed before all servers 120 in the service group have responded is important for certain on-line services (such as the BBS service) which process large numbers of update transactions per day, and which therefore require the rapid processing of update transactions. This performance benefit cannot be achieved with prior art techniques such as the two-phase commit protocol.

13. Transaction Log

Each Arbiter maintains a transaction log 706 on the hard disk of its respective Arbiter microcomputer 128. Each transaction log consists of the following the following three disk structures: (1) a TRANSACT.DAT file, (2) a TRAN_LOG directory containing transaction-specific log files, and (3) a TRAN_DAT directory containing transaction data. Each of these disk structures is described below.

TRANACT.DAT file

The TRANSACT.DAT file contains two, four byte values. The first four byte value is the transaction ID (TRID) of the first transaction that is recorded in the transaction log. The second four byte value is the number of transactions recorded in the transaction log.

Transaction IDs are assigned sequentially (within each service group) by the Arbiter, and wrap around once the maximum ID of FFFFFFFF (hexadecimal) is reached (i.e., after FFFFFFFF, the next TRID assigned is 00000000). The transaction log is "full," meaning that additional transactions cannot be issued, when either (1) the Arbiter microcomputer's hard disk is full, or (2) the number of transactions (indicated by the first four byte value) reaches FFFFFFFF. To avoid either of these two situations, the transaction logs are trimmed by the Arbiter's trim thread. The Arbiter provides services with the following trim policy options:

(1) Remove the transactions that have already been processed by the service group members currently running.

(2) Remove all transactions older than service group backup timestamp.

(3) Remove transactions (on a first-in-first-out basis) so as to maintain free disk space above a particular threshold.

(4) Keep at least the N most recent transactions.

(5) Never trim.

TRAN_LOG directory

The TRAN_LOG directory is used to store the information that specifies the transactions that have been submitted to the Arbiter. For each transaction in the transaction log 706, there is a corresponding transaction log file in the TRANS_LOG directory. The transaction log files are named according to the convention<TRID>.LOG (e.g., 00000001.LOG, 00000002.LOG, ... ).

Every transaction log file in the TRAN_LOG dire ctory has the same structure, which is shown in FIG. 10. As illustrated by FIG. 10, each transaction log file includes a series of timestamps which indicate (1) when the transaction was received by the Arbiter, (2) when the transaction was replicated by the Arbiter, and (3) when the final status of the transaction became known to the Arbiter. These timestamps can be used to evaluate Arbiter performance.

The transaction log file also includes a full specification of the transaction, including the transaction type and the transaction data. If the transaction was issued via a call to FReplicateBuffer, then the TRANSACTION_BUFFER flag is set, and the Buffer field of the RPC_TRANSACTION structure contains a copy of the buffer data passed to FReplicateBuffer.

Figure 11:
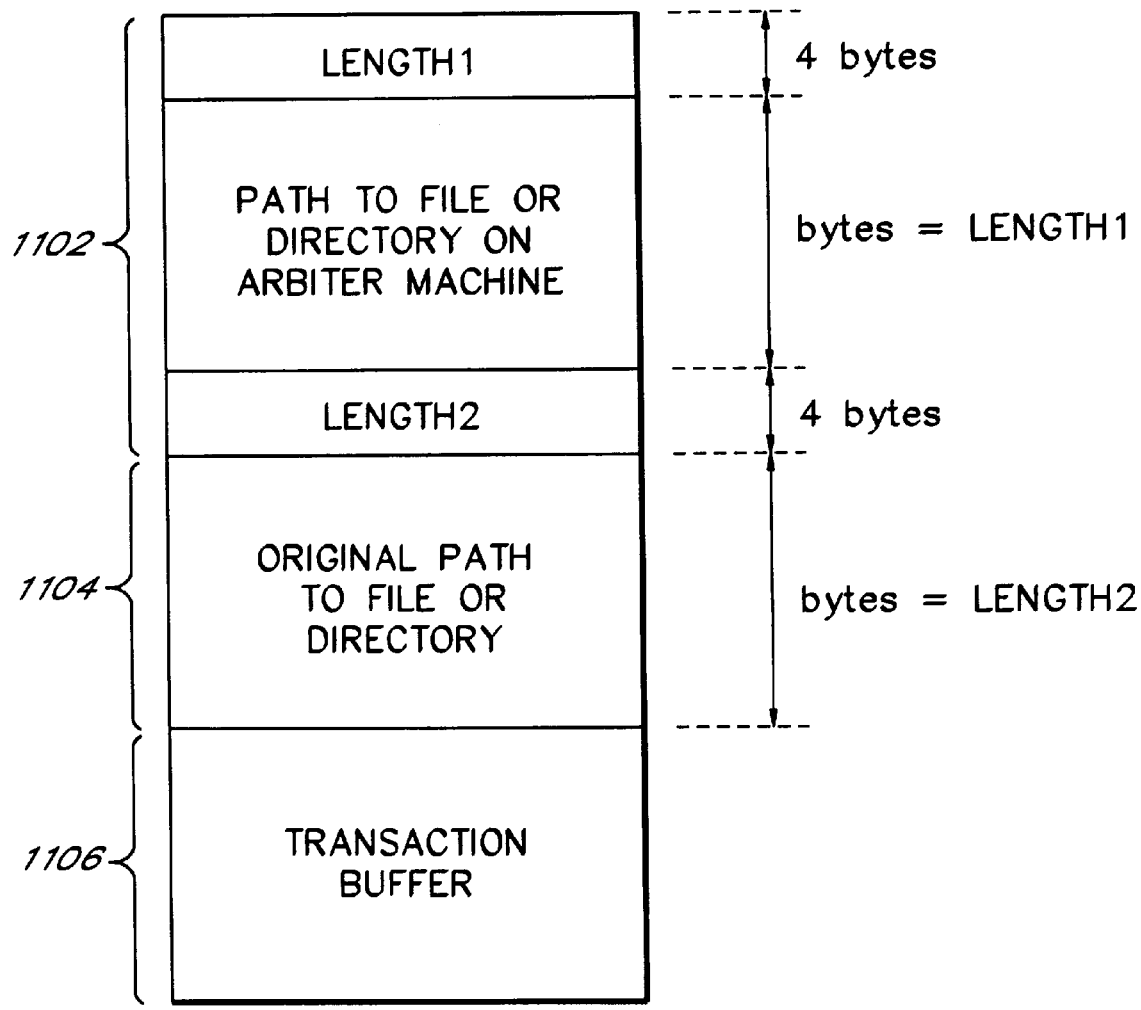
FIG. 11 illustrates the format of data contained within the buffer field of the RPC_TRANSACTION structure of FIG. 10.

If the transaction was issued by a call to FReplicateFile or FReplicateDir, then the TRANSACTION_FILE or TRANSACTION_DIRECTORY flag (respectively) is set, and the RPC_TRANSACTION buffer field contains the structure illustrated in FIG. 11. This structure consists of the following:

(1) a size-prefixed UNC (universal naming convention) path 1102 to the file or directory in the Arbiter microcomputer 128 (stored within the TRAN_DAT directory, as described below), (2) a size-prefixed UNC path 1104 to the file or directory in the original machine, and (3) any buffer data 1106 included in the transaction.

With further reference to FIG. 10, the transaction log file also includes flags which indicate whether the transaction is pending or completed. If the transaction is completed, the transaction log file also contains a final status code, indicating the final status of the transaction. The final status codes are generated by the Arbiter using the procedure described above under the heading STATUS CODES AND CONFLICT RESOLUTION.

As indicated by the foregoing, each transaction log file consists of the transaction information that was forwarded to the servers 120 of the service group 714 by the Arbiter (via RPC), plus certain header and status information. The Buffer field of the RPC_TRANSACTION structure contains the buffer data (if any) provided by the server/service which initiated the transaction, plus the paths to any associated file or directory that was included in the transaction. (As indicated above, any file or directory replicated by the Arbiter is copied to the hard disk of the Arbiter microcomputer 128 which replicates the transaction). This transaction log structure allows previously-issued transactions to be subsequently submitted to other servers (via RPC) with minimal processing.

TRAN_DAT directory

The TRAN_DAT directory contains any extra transaction data that is not contained within the associated transaction file (i.e., all data other than buffer data contained within the transaction log file). This information is stored as follows:

Files replicated via calls to FReplicateFile are stored in a file with the name <TRID>.FIL. Thus, for example, if transaction number 7 is a transaction replicated using FReplicateFile, two transaction log files would be created: (1) a transaction log file with the name 00000007.LOG, which would be stored within the TRAN_LOG directory, and would include any replicated buffer data, and (2) a file with the name 00000007.FIL, which would be stored in the TRAN_DAT directory, and which would be a copy of the replicated file.

Directories replicated using the FReplicateDir are stored in a subdirectory with the name <TRID>.DIR. Thus, for example, if transaction number 8 is a transaction replicated using FReplicateDir, the following would be created: (1) a transaction log file with the name 00000008.LOG, which would be stored within the TRAN_LOG directory, and which would include any replicated buffer data, and (2) a subdirectory (of the TRAN_DAT directory) with the name 00000008.DIR, which would contain a copy of the entire directory tree specified in FReplicateDir.

14. Server Startup

Figure 12:
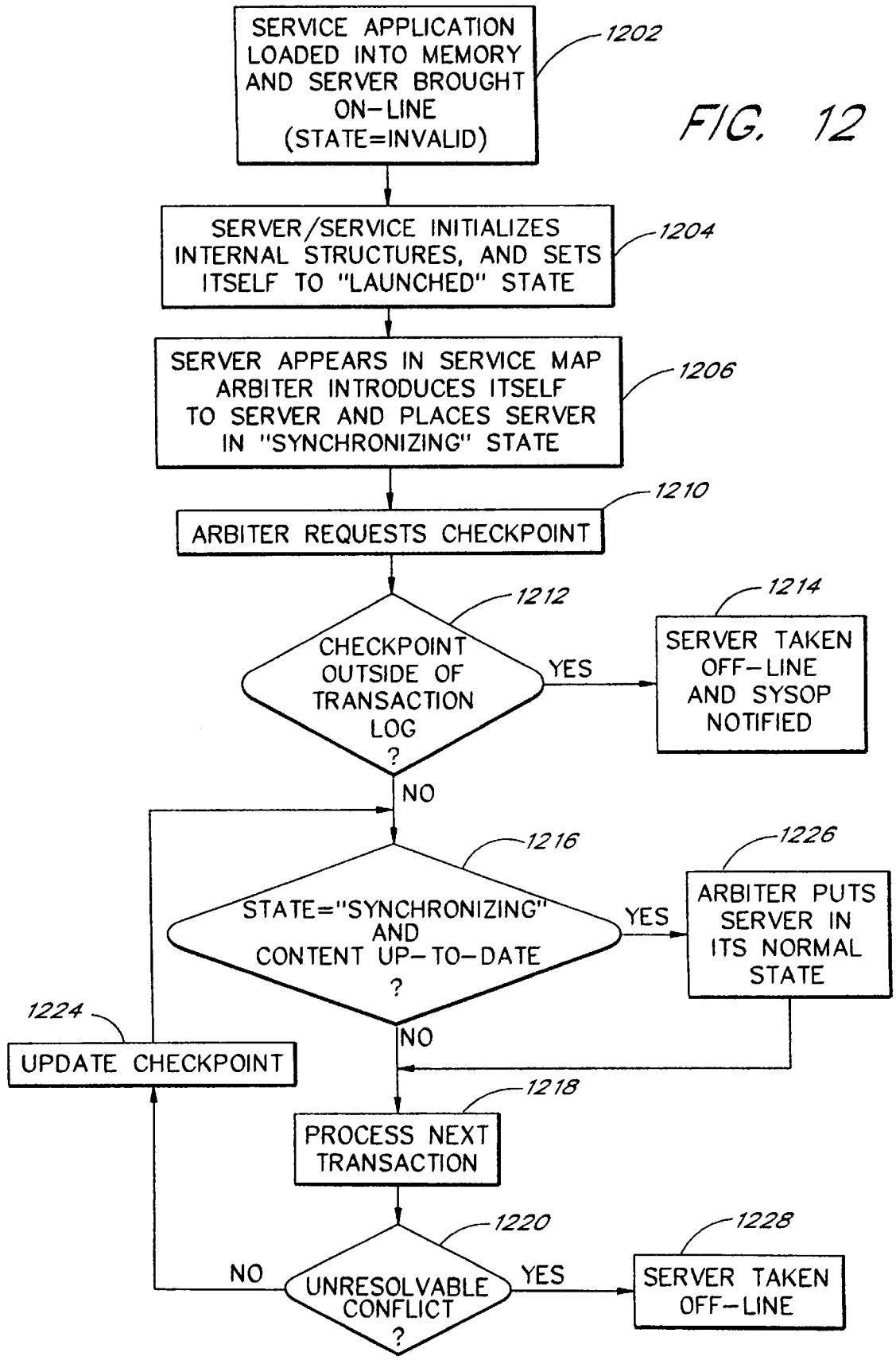
FIG. 12 illustrates the sequence of events that occur when an application server is brought on-line within a service group that uses the Arbiter service.

FIG. 12 illustrates the sequence of events that occur when a server 120 is initially brought on-line within an Arbitered service group that uses the Arbiter to replicate all update transactions. A server 120 can be brought on-line by loading the appropriate service application/s on the server 120, and updating the global registry 145 to indicate the assignment of the server 120 to a service group. This can typically be done from a system console machine (not shown) on the LAN 122. The new server 120 may, for example, be a server that was previously taken off-line for maintenance within the service group 714, or a server that is being reallocated from one service to another service.

When the server 120 is initially brought on-line, it is in the "invalid" state (as indicated by block 1202), and does not appear in the service map 136. Once the service application has initialized its internal structures it places itself in the "launched" state, as indicated by block 1204. The new server 120 forwards its service description 400 (FIG. 4), including its state, to the service map dispatcher 144, and this service description 400 is incorporated within the next service map 136 sent out by the service map dispatcher 144.

As indicated by block 1206, in response to seeing one of its servers 120 switch to the "launched" state, the Arbiter microcomputer 128 in charge of the service group introduces itself to the new server (by sending the Arbiter microcomputer's IP address to the server), and sets the server's state to "synchronizing." As indicated by blocks 1210 and 1212, the Arbiter also requests the checkpoint from the server 120 (which is the transaction ID of the last transaction, if any, processed by the new server within the current service group), and checks to see if the service group's transaction log 706 contains this checkpoint. (This is done by comparing the checkpoint to the first four byte value in the TRANSACT.DAT file which, as described above, contains the ID of the first transaction in the transaction log.) As indicated by block 1214, if the checkpoint is not in the transaction log, the server 120 is taken off-line (by placing the server in the "stopped" state), and a system operator is notified of the Arbiter's inability to bring the server up-to-date. Note that blocks 1206–1214 in FIG. 12 correspond to reference number 802 in FIG. 8.

If the checkpoint is within the transaction log 706, a dispatcher thread of the Arbiter enters into a loop (indicated by blocks 1216–1226 of FIG. 12, and by reference number 804 in FIG. 8) in which transactions are read from the service group's transaction log and submitted to the new server for processing. During this process, only the transactions for which a successful outcome is indicated in the transaction log file are submitted to the new server 120. As the transactions are processed by the new server, the Arbiter monitors the transaction status codes returned, and takes the new server off-line if an error occurs (as indicated by blocks 1220 and 1228). Each time a transaction is successfully completed, the server 120 updates it's checkpoint.

As indicated by blocks 1216 and 1226, once all non-pending transactions have been successfully completed by the new server (indicating that the server's content data is up-to-date, or equivalently, that the new server is "synchronized" with the other servers 120 of the service group), the server is placed in its normal state. The dispatcher thread then continues in the loop, submitting any new transactions that appear in the transaction log 706 to the server.

Advantageously, the above-described method of adding a server 120 to a service group 714 does not consume the processing resources of the other servers 120 of the service group. Thus, the existing servers 120 can continue to process client service requests without having to allocate processing resources to the bring-up of the new server.

Further, because only those transactions that were missed by the new server are submitted to the new server during bring-up, servers briefly taken off-line for backup or other maintenance can be rolled forward rapidly.

15. Arbiter Startup

Figure 13:
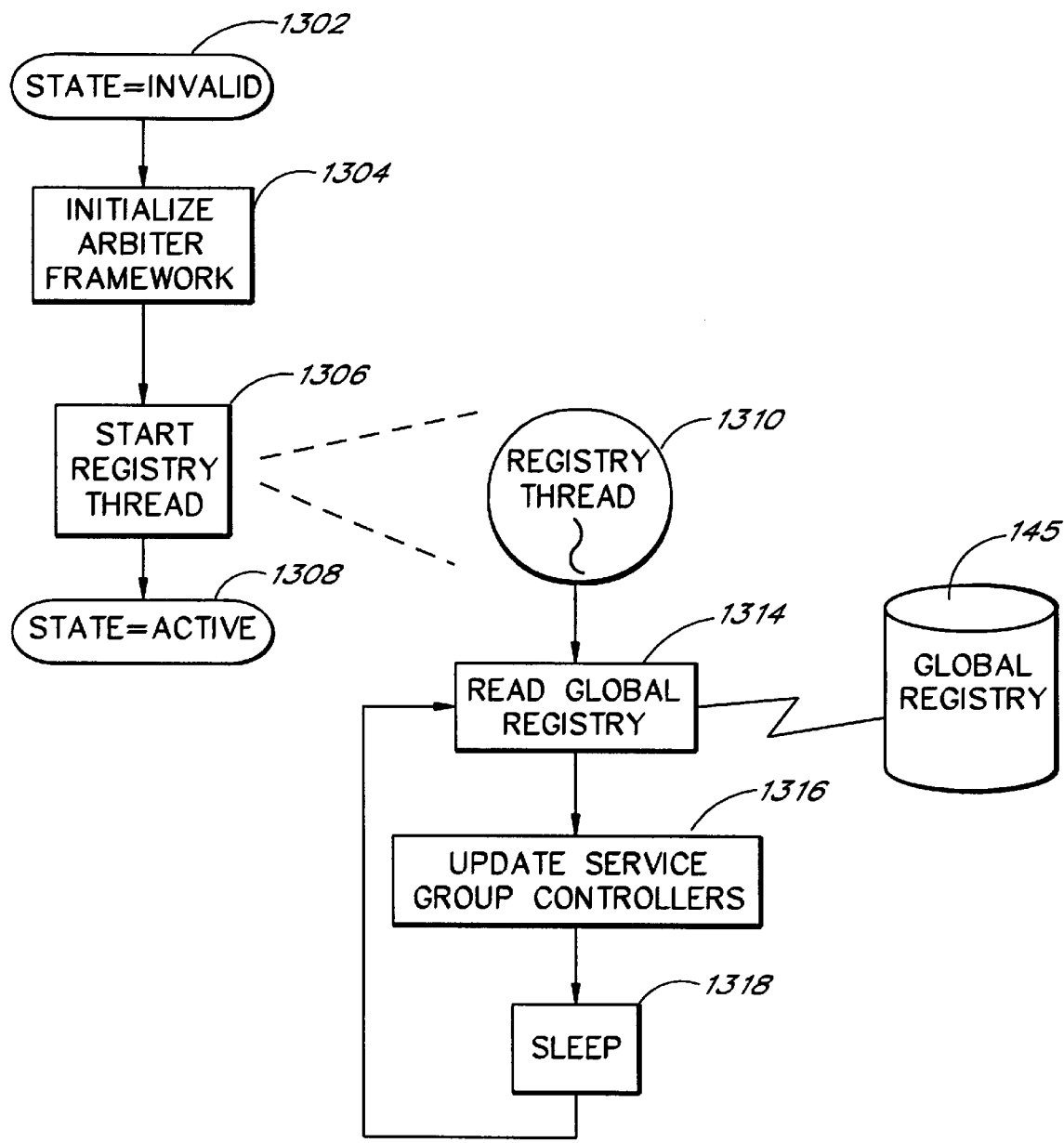
FIG. 13 illustrates the sequence of events that occur when the Arbiter service is started on an Arbiter computer.

The Arbiter may be started on an Arbiter microcomputer 128 via commands that are issued from a system console. The sequence of events that occur when the Arbiter is started are illustrated in FIG. 13.

As indicated by blocks 1302–1308, when the Arbiter service is initially brought on-line on a machine, the Arbiter service is in the "invalid" state (just as with other services in the host data center 104). During its initialization, the Arbiter sets up the Arbiter framework and starts the registry thread 1310. After initialization is complete, the Arbiter sets its state to "active."

As indicated by blocks 1314–1318, once started, the registry thread 1310 enters into a continuous loop in which it reads the global registry 145 and updates the Arbiter's service group controllers 702. The various functions performed by the registry thread in response to changes in global registry content are described in detail above under the heading ARBITER STRUCTURE.

16. Arbiter Failure

The failure of an Arbiter prevents the replication of transactions within the Arbiter's service group, but advantageously does not prevent the servers from handling client service requests. Thus, for example, an end user of the BBS service can continue to read BBS messages in the event of a failure of the BBS Arbiter, and is prevented only from modifying BBS content data.

While the Arbiter is inoperative, the servers 120 of the service group queue any update transactions on their respective hard disks. When the Arbiter comes back on line, the queued transactions are submitted to the Arbiter for replication. Thus, for example, while the Arbiter is down, BBS users can continue to submit messages, and the messages will be replicated when the Arbiter comes back on-line.

This advantage flows from the implementation of the Arbiter as a separate service, running on separate microcomputers 128 from the machines used to directly service end-users. Stated more generally, by moving the replication logic of on-line services to a separate, background service which is not visible end users, the present invention shields end users from replication problems that would otherwise be visible.

17. Conclusion

Although this invention has been described in terms of certain preferred embodiments, other embodiments that are apparent to those or ordinary skill in the art are also within the scope of this invention. Further, although the invention has been described in the context of on-line services networks, it will be recognized that various aspects of the invention are applicable to other types of distributed networks. Accordingly, the scope of the present invention is intended to be defined only by reference to the appended claims.

What is claimed is:

1. In a computer network that provides content-based services to users of the network, a system for providing a replicated end-user service, comprising:

a plurality of application servers locally interconnected to one another and running respective copies of an end-user application to collectively implement the replicated end-user service, the end-user service providing user access to service content data over the network, replicated copies of the service content data stored locally on each respective application server of the plurality, the end-user service application configured to receive client transactions over the network from end-users, including client transactions that specify updates to the service content data; and a replication service that provides generic transaction replication services for the end-user service to maintain consistency between the replicated copies of the service content data, the replication service including a replication service application that runs on at least one computer that is separate from and locally connected to the plurality of application servers, the replication service application including an application program interface (API) that enables the end-user service, and other replicated services of the network, to access the generic transaction replication services of the replication service by making API calls over the network to the replication service;

wherein individual application servers of the plurality of application servers send update transactions over the network to the replication service in response to actions of the users of the end-user service, the update transactions specifying updates to the service content data;

wherein the replication service dispatches the update transactions to each of the application servers for processing and monitors the processing of the update transactions by the application servers;

wherein the replication service and the end-user service collectively implement an update protocol in which each application server of the plurality responds to receipt of an update transaction from the replication service by immediately attempting to perform an update specified by the update transaction, so that updates to the related copies of the service content data are completed without the need for additional message traffic on the network;

wherein the application servers report respective outcomes of an update transaction to the replication service after processing the update transaction; and Wherein the replication service applies a voting protocol to the outcomes reported by the application servers to resolve inconsistencies between the application servers and takes an application server of the plurality of the application servers off-line when the replication service determines, based on the voting protocol, that an outcome reported by the application server is inconsistent with a final outcome reached by the plurality of application servers.

2. The system of claim 1, wherein the replication service generates and stores a transaction log that includes update transactions that have been dispatched to the plurality of application servers.

3. The system of claim 2, wherein the replication service is configured use the transaction log to separately roll-forward a new application server that runs the end-user service application, without communicating with the plurality of application servers, to synchronize the new application server with the plurality of application servers.

4. The system of claim 1, wherein the end-user service is a bulletin board system (BBS) service which allows users to post messages for review by other users, the messages forming at least a portion of the service content data.

5. The system of claim 1, wherein the API includes a callable method that replicates the contents of a memory buffer specified by the end-user service.

6. In a computer network, an extinsible architecture for providing replicated services to end users of the network, the architecture comprising:

a replication service that provides generic transaction replication services to other services of the network, the replication service running on at least one computer of the network and providing a software interface that enables the other services to use the generic transaction replication services;

a first end-user service that provides a first content-based service to end users of the network, the first end-user service running on, and storing replicated copies of a first dataset on, a first plurality of servers that are interconnected by the network, the first end-user service configured to implement a client side of the software interface, and configured to use the replication service to replicate transactions among the first plurality of servers to maintain consistency between the replicated copies of the first dataset; and a second end-user that provides a second content-based service to end-users of the network, the second content-based service distinct from the first content-based service, the second end-user service running on, and storing replicated copies of a second dataset on, a second plurality of servers that are interconnected by the network, the second plurality of servers different from the first plurality of servers, the second end-user service configured to implement the client side of the software interface, and configured to use the replication service to replicate transactions among the second plurality of servers to maintain consistency between the replicated copies of the second dataset;

wherein the replication service selectively takes individual servers of at least the first plurality of servers off-line when an inconsistency occurs between the replicated first datasets, the replication service thereby preventing end users from accessing inconsistent copies of the first dataset.

7. The architecture of claim 6, wherein the replication service runs on a first computer that is allocated to the first end-user service, the first computer separate from the first plurality of servers, and wherein the transaction replication service further runs on a second computer that is allocated to the second end-user service, the second computer separate from the second plurality of servers.

8. The architecture of claim 6, wherein at least the first end-user service and the replication service implement an update protocol in which the replication service dispatches update transactions to the first plurality of computers, the update transactions specifying updates to the replicated copies of the first dataset, and wherein each computer of the first plurality of computers responds to an update transaction by attempting to execute the update transaction without first generating a response message on the network.

9. The architecture of claim 6, wherein the replication service is configured to dispatch a sequence of update transactions that were previously processed by the first plurality of servers to a new server while maintaining the new server in a non-operational mode, without dispatching the sequence of update transactions to any of the servers of the first plurality, to synchronize the new server with the first plurality of servers without interfering with the first plurality of servers.

10. A computer-readable medium having strored thereon an executable service application that provides generic transaction replication services, the service application configured to run on a computer of a network in association with an end-user service in which service content data is replicated across a plurality of servers, the service application configured to communicate with, and to provide the generic transaction services to, the end-user service over the network via an application program interface (API) of the service application, the service application further configured to process update transactions received from the end-user service, and to dispatch the update transactions over the network to the plurality of servers for processing, the update transactions specifying updates to the service content data, wherein the service application responds to receipt of an update transaction from the end-user service by at least: (a) recording the update transaction within a transaction log on the computer; (b) dispatching the update transaction to each of the plurality of servers for processing; (c) monitoring the processing of the update transaction by each of the plurality of servers; and (d) Automatically taking at lest one server of the plurality of servers off-line when it is determined in step Ⓒ that the at least one server has reached a transaction-processing outcome that is different from a final transaction-processing outcome reached by the plurality of servers.

11. The computer-readable medium of claim 10, wherein the service application is configured to record update transactions that have been processed by the plurality of servers within a transaction log, and wherein the service application is configured support the addition of a new server to a service group that comprises the plurality of servers by:

(a) automatically dispatching to the new server a sequence of update transactions that are recorded within the transaction log to synchronize the new server with the plurality of servers, the step of dispatching performed with the new server in a non-operational mode and with the plurality of servers in an operational, on-line mode; and (b) when the new server is synchronized with the plurality of servers, automatically placing the new server in the on-line mode to add the new server to the service group.

12. The computer-readable medium of claim 10, wherein the API includes callable methods for replicating at least a file, a directory, and a buffer.

13. A client-server type service that provides clients with read/write access to service content data, the service comprising:

a group of locally-interconnected servers, each server of the group locally storing a respective copy of the service content data, the servers of the group configured to receive client requests over a network, the client requests including client update requests that specify modifications to the service content data; and a server application, the server application separately running on each server of the group and providing at least client access to the service content data, the server application configured to, on each respective server group:

(a) receive the client update requests and generate update transactions therefrom, (b) forward the update transactions over the network to a transaction replication service for replication across the group, the transaction replication service separate from the client-server service and running on at least one computer that is not part of the group, and (c) receive and process update transactions dispatched to the group over the network by the transaction replication service, to modify a respective copy of the service content data, wherein the server application is further configured to, on each respective server of the group, return a transaction status code to the transaction replication service over the network, the transaction status code indicating, for the respective server, at least a success or failure of an update transaction; and Wherein the transaction replication service selectively takes at least one server of the group of servers off-line when it is determined that the at least one server was reached an outcome that is inconsistent with a final outcome reached by the group servers.

14. The client-server type service as in claim 13, wherein the update transactions comprise server-application-specific commands that are meaningless to the transaction replication service.

15. The client-server type service as in claim 13, wherein the update transactions comprise Bulletin Board System (BBS) messages.

16. The client-server type service as in claim 13, wherein the server application is further configured to generate an update transaction that specifies a buffer to be replicated across the group.

17. A transaction replication system for performing generic transaction replication services for groups of application servers, each application server of a group running a transaction-based service application that is adapted to use the transaction replication system to pass service-specific information between the servers of the group as transactions, the system comprising:

a replication computer, the replication computer separate from and locally connected to the application servers of the group by a local area network and configured to receive transactions over the network from the application servers of the group, the replication computer configured to maintain a transaction log, the transaction log containing transactions previously received by the replication computer from individual application servers of the group; and a replication service application running on the replication computer to implement a generic transaction replication service, the transaction replication service configured to replicate received transactions by forwarding the received transactions to every application server of the group for processing;

the transaction replication service further configured to, when a transaction is received by the replication computer from one of the applications servers of the group, do each of:

(a) store the transaction in the transaction log;

(b) forward the transaction to each application server of the group for immediate processing, (c) receive a status code from each application server of the group, the status code indicating, for each respective application server of the group, whether or not the transaction was successfully processed, (d) determine a final outcome of the transaction, and (e) take off-line an application server of the group which is inconsistent with the final outcome reached by the group.

18. A method of rapidly processing client update requests which specify updates to server data, replicated copies of the server data stored on respective servers of a group, the method comprising the steps of:

(a) on at least one server of the group, doing each of:

(a1) receiving client update requests and generating update transactions therefrom, the update transactions specifying updates to the server data, (a2) forwarding the update transactions over a network to a transaction replication service for replication across the group, (a3) responding to an update transaction received over the network from the transaction replication service by attempting to immediately process the update transaction, to update a replicated copy of the server data, without first generating a response message on the network, so the dispatched update transactions are completed in a single phase, and (a4) returning a status code to the transaction replication service to indicate a "success" or a "failure" of an update transaction processed in step (a3); and (b) at a computer running a replication service application that implements the transaction replication service, doing each of:

(b1) receiving update transactions from the servers of the group, (b2) dispatching the update transactions received in step (b1) to the servers of the group, (b3) receiving status codes from the servers of the group and determining a final outcome of a corresponding transaction therefrom, and (b4) when a server of the group is inconsistent with the final outcome, automatically taking the inconsistent server off-line to remove the inconsistency.

19. The method as in claim 18, wherein the computer is separate from the servers of the group.

20. The method as in claim 18, wherein the transaction replication service provides generic transaction replication services.

21. In a computer network in which each server of a plurality of servers stores a respective copy of a dataset, a method of updating copies of the dataset stored by the plurality of servers, the method comprising the steps of:

sending an update transaction over the network from a computer to the plurality of servers, the update transaction specifying an update to the dataset, the computer separate from the plurality of servers and running software that manages updates to the dataset;

at each server of the plurality, responding to the update transaction by (i) attempting to perform the update, without generating message traffic on the network prior to said attempting, and (ii) after attempting to perform the update, returning a report message over the network to the computer, the report message indicating an outcome of the update transaction; and When the report messages returned by the plurality of servers indicate that an inconsistency exists between copies of the dataset, applying a voting protocol to selectively takes at least one server of the plurality of servers off-line to resolve the inconsistency.

* * * * *

UNITED STATES PATENT AND TRADEMARK OFFICE
CERTIFICATE OF CORRECTION

PATENT NO. : 5,956,489

DATED : September 21, 1999

INVENTOR(S) : San Andres et al.

It is certified that error appears in the above-identified patent and that said Letters Patent is hereby corrected as shown below:

On The Title Page:

In Section [75] Inventors: "Berkeley, Calif." should read --Marietta, GA--.

In Section [75] Inventors: "Paris, France" should read --Bellevue, Wash.--

In Section [56], page 2, line 5: "Ozar" should read --Ozur--.

In The Specification:

In Column 15, line 3: *"Win32Programmer's"* should read --*Win32 Programmer's*--.

In Column 26, line 38: "szpath" should read --szPath--.

In Column 28, line 33: please delete "¹".

In Column 28, line 44: "Let $s_o$" should read --Let $S_o$--.

Signed and Sealed this

Tenth Day of April, 2001

Attest:

NICHOLAS P. GODICI

Attesting Officer     Acting Director of the United States Patent and Trademark Office